(12) United States Patent
Murakami et al.

(10) Patent No.: US 8,731,037 B2
(45) Date of Patent: May 20, 2014

(54) RECEIVER, INTEGRATED CIRCUIT, RECEIVING METHOD, AND PROGRAM

(75) Inventors: Mariko Murakami, Osaka (JP);
Yoshinobu Matsumura, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/809,921

(22) PCT Filed: May 17, 2012

(86) PCT No.: PCT/JP2012/003254
§ 371 (c)(1),
(2), (4) Date: Jan. 14, 2013

(87) PCT Pub. No.: WO2012/157281
PCT Pub. Date: Nov. 22, 2012

(65) Prior Publication Data
US 2013/0114659 A1  May 9, 2013

(30) Foreign Application Priority Data

May 18, 2011  (JP) .................................. 2011-111893

(51) Int. Cl.
*H04B 3/46* (2006.01)
*H04B 17/00* (2006.01)

(52) U.S. Cl.
USPC ............ 375/224; 375/340; 370/203; 370/208

(58) Field of Classification Search
USPC .................... 375/224, 260, 340; 370/203–211
See application file for complete search history.

(56) References Cited

U.S. PATENT DOCUMENTS

| 7,991,058 B2 | 8/2011 | Setoh et al. |
| 8,229,708 B2 | 7/2012 | Mantravadi et al. |

(Continued)

FOREIGN PATENT DOCUMENTS

| EP | 1 441 484 | 7/2004 |
| EP | 2 242 226 | 10/2010 |

(Continued)

OTHER PUBLICATIONS

Jun Mashino et al., Frequency Utilization Efficiency Improvement by Superposed Multicarrier Transmission Scheme, The Institute of Electronics, Information and communication Engineers, Aug. 20, 2008, vol. 108, No. 188, pp. 85-90, RCS2008-67 (with English Abstract and Figs. 1-4).

(Continued)

*Primary Examiner* — Curtis Odom
(74) *Attorney, Agent, or Firm* — Wenderoth, Lind & Ponack, LLP.

(57) ABSTRACT

A receiver includes a demodulator that demodulates a modulation wave modulated according to orthogonal frequency division multiplexing (OFDM). The demodulator includes an interference wave detector that detects that received modulation wave includes interference wave when received power of each sample of the received modulation wave exceeds a threshold, and upon the detection, executes replacement processing of replacing a received signal exceeding the threshold with a predetermined value, a first interference wave power estimation unit configured to estimate interference wave power included in an OFDM symbol included in the received modulation wave on the basis of the number of samples that have been subjected to the replacement processing, and a demodulated data generator that demodulates the received modulation wave by executing demodulation processing of demodulating the received modulation wave that has been subjected to the replacement processing on the basis of the interference wave power.

16 Claims, 26 Drawing Sheets

(56) References Cited

U.S. PATENT DOCUMENTS

| | | |
|---|---|---|
| 2003/0210749 A1 | 11/2003 | Asjadi |
| 2007/0036239 A1* | 2/2007 | Ma et al. .................. 375/316 |
| 2008/0123540 A1 | 5/2008 | Mantravadi et al. |
| 2008/0304587 A1 | 12/2008 | Setoh et al. |
| 2010/0246726 A1 | 9/2010 | Asjadi |

FOREIGN PATENT DOCUMENTS

| | | |
|---|---|---|
| JP | 2004-166200 | 6/2004 |
| JP | 2004-228853 | 8/2004 |
| JP | 2005-333528 | 12/2005 |
| JP | 3740468 | 2/2006 |
| JP | 2006-295727 | 10/2006 |
| JP | 2010-511355 | 4/2010 |
| WO | 2006/068186 | 6/2006 |
| WO | 2008/067255 | 6/2008 |

OTHER PUBLICATIONS

Takashi Yokokawa et al., Parity and column twist bit interleaver for DVB-T2 LDPC codes, 2008 5th International Symposium on Turbo Codes and Related Topics, Sep. 5, 2008, pp. 123-127.

International Search Report issued Jun. 12, 2012 in International (PCT) Application No. PCT/JP2012/003254.

Pierre Siohan et al., "Optimization of Turbo Decoding Performance in the Presence of Impulsive Noise using Soft Limitation at the Receiver Side", IEEE GLOBECOM 2008, Nov. 30-Dec. 4, 2008, pp. 1-5.

Takuya Kitamura et al., "Effect of Impulse Noize Mitigation Technique by using sample replacement and replica signal estimation for OFDM system", The Institute of Image Information and Television Engineers, ITE Technical Report, Jul. 29, 2010, vol. 34, No. 33, pp. 1-4, BCT2010-55.

* cited by examiner

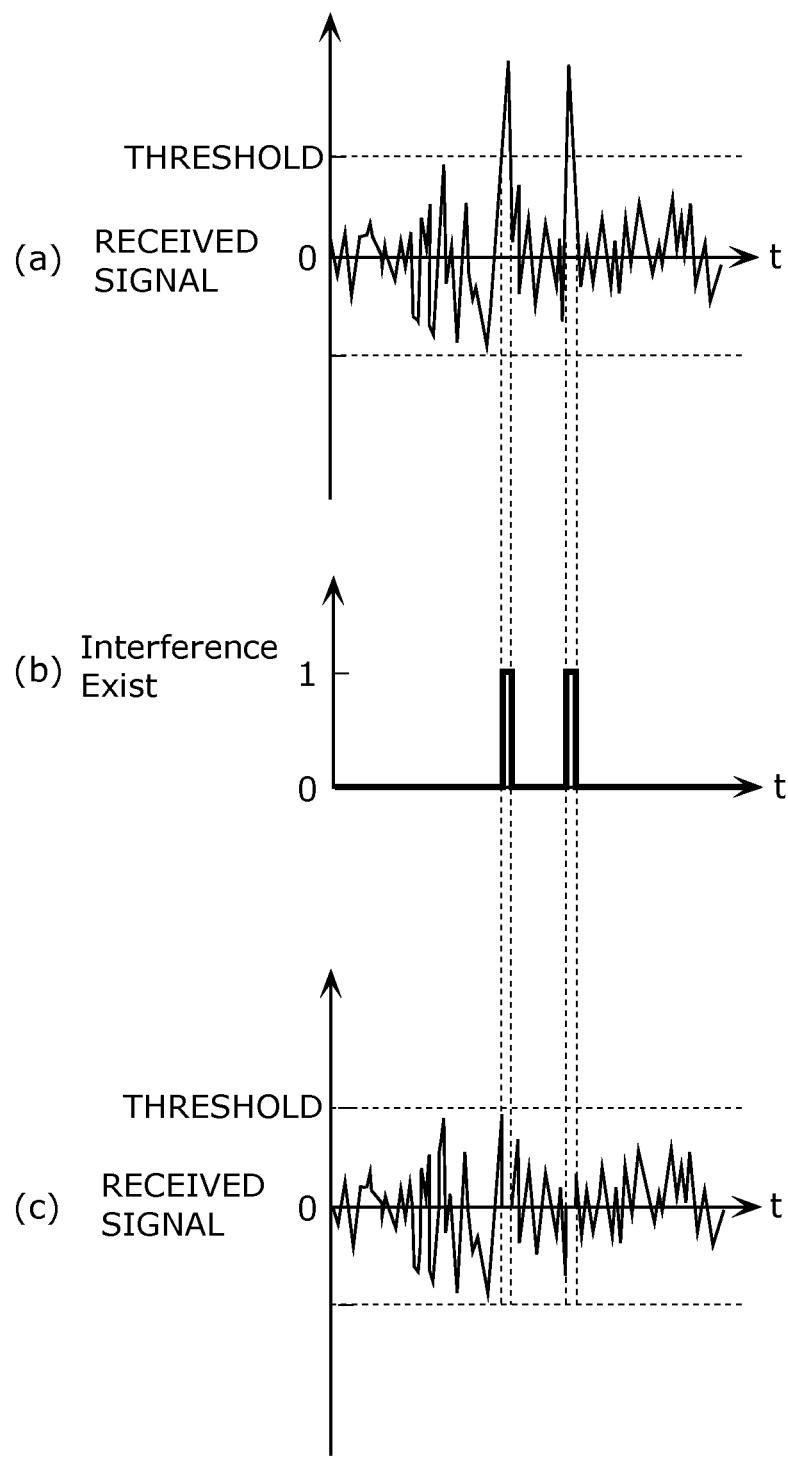

| FFT SIZE | THE NUMBER OF P2 SYMBOLS |
|---|---|
| 1 k | 16 |
| 2 k | 8 |
| 4 k | 4 |
| 8 k | 2 |
| 16 k | 1 |
| 32 k | 1 |

FIG. 22

| PILOT PATTERN | $D_X$ | $D_Y$ | $D_X D_Y$ |
|---|---|---|---|
| PP1 | 3 | 4 | 12 |
| PP2 | 6 | 2 | 12 |
| PP3 | 6 | 4 | 24 |
| PP4 | 12 | 2 | 24 |
| PP5 | 12 | 4 | 48 |
| PP6 | 24 | 2 | 48 |
| PP7 | 24 | 4 | 96 |
| PP8 | 6 | 16 | 96 |

T220

| FFT SIZE | USED CP GROUP | K_mod |
|---|---|---|
| 1 k | CP_g1 | 1632 |
| 2 k | CP_g1, CP_g2 | 1632 |
| 4 k | CP_g1, CP_g2, CP_g3 | 3264 |
| 8 k | CP_g1, CP_g2, CP_g3, CP_g4 | 6528 |
| 16 k | CP_g1, CP_g2, CP_g3, CP_g4, CP_g5 | 13056 |
| 32 k | CP_g1, CP_g2, CP_g3, CP_g4, CP_g5, CP_g6 | NA |

| | PP1 | PP2 | PP3 | PP4 | PP5 | PP6 | PP7 | PP8 |
|---|---|---|---|---|---|---|---|---|
| Cp_g1 | 116 255<br>285 430<br>518 546<br>601 646<br>744 1662<br>1893 1995<br>2322 3309<br>3351 3567<br>3813 4032<br>5568 5706 | 116 318<br>390 430<br>474 518<br>601 646<br>708 726<br>1752 1758<br>1944 2100<br>2208 2466<br>3792 5322<br>5454 5640 | 116 318<br>342 426<br>430 518<br>582 601<br>646 816<br>1758 1764<br>2400 3450<br>3504 3888<br>4020 4932<br>5154 5250<br>5292 5334 | 108 116<br>144 264<br>288 430<br>518 601<br>636 646<br>828 2184<br>3360 3396<br>3912 4032<br>4932 5220<br>5676 5688 | 108 116<br>228 430<br>518 601<br>646 804<br>1644 1680<br>1752 1800<br>1836 3288<br>3660 4080<br>4932 4968<br>5472 | | 264 360<br>1848 2088<br>2112 2160<br>2256 2280<br>3936 3960<br>3984 5016<br>5136 5208<br>5664 | |
| | 1022 1224<br>1302 1371<br>1495 2261<br>2551 2583<br>2649 3192<br>2925 5395<br>4266 5881<br>5710<br>8164<br>10568<br>11069<br>11560<br>12631<br>12946<br>13954<br>16745<br>21494 | 1022 1092<br>1369 1416<br>1446 1495<br>2598 2833<br>2928 3144<br>4410 4800<br>5710 5881<br>6018 6126<br>10568<br>11515<br>12946<br>13954<br>15559<br>16681 | 1022 1495<br>2261 2551<br>2802 2820<br>2833 2922<br>4422 4752<br>4884 5710<br>8164<br>10568<br>11069<br>11560<br>11515<br>12631<br>12946<br>16745<br>21494 | 601 1022<br>1092 1164<br>1369 1392<br>1452 1495<br>2261 2580<br>2833 3072<br>4320 4452<br>5710 5881<br>6048<br>10568<br>11515<br>12946<br>13954<br>15559<br>16681 | 852 1022<br>1495 2508<br>2551 2604<br>2664 2736<br>2833 3120<br>4248 4512<br>4836 5710<br>5940 6108<br>8164<br>10568<br>11069<br>11560<br>12946<br>13954<br>21494 | | 116 430<br>518 601<br>646 1022<br>1296 1368<br>1369 1495<br>2833 3024<br>4416 4608<br>4776 5710<br>5881 6168<br>7013 8164<br>10568<br>10709<br>11515<br>12946<br>15559<br>23239<br>24934<br>25879<br>26308<br>26674 | |
| Cp_g2 | | 2261 8164 | 13954 | 8164 | 648 4644<br>16745 | | 456 480<br>2261 6072<br>17500 | |
| Cp_g3 | | | | | | | | |

FIG. 25

| Cp_g4 | PP1 | PP2 | PP3 | PP4 | PP5 | PP6 | PP7 | PP8 |
|---|---|---|---|---|---|---|---|---|
| | | 10709 | | 10709 | | 12631 | 116 132 | |
| | | 19930 | | 19930 | | 1008 6120 | 180 430 | |
| | | | | | | 13954 | 518 601 | |
| | | | | | | | 646 1022 | |
| | | | | | | | 1266 1369 | |
| | | | | | | | 1495 2261 | |
| | | | | | | | 2490 2251 | |
| | | | | | | | 2712 2833 | |
| | | | | | | | 3372 3438 | |
| | | | | | | | 4086 4098 | |
| | | | | | | | 4368 4572 | |
| | | | | | | | 4614 4746 | |
| | | | | | | | 4830 4968 | |
| | | | | | | | 5395 5710 | |
| | | | | | | | 5881 7649 | |
| | | | | | | | 8164 | |
| | | | | | | | 10568 | |
| | | | | | | | 11069 | |
| | | | | | | | 11560 | |
| | | | | | | | 12631 | |
| | | | | | | | 12946 | |
| | | | | | | | 13954 | |
| | | | | | | | 15760 | |
| | | | | | | | 16612 | |
| | | | | | | | 16745 | |
| | | | | | | | 17500 | |
| | | | | | | | 19078 | |
| | | | | | | | 19930 | |
| | | | | | | | 21494 | |
| | | | | | | | 22867 | |
| | | | | | | | 25879 | |
| | | | | | | | 26308 | |

| FFT SIZE | PP1 | PP2 | PP3 | PP4 | PP5 | PP6 | PP7 | PP8 |
|---|---|---|---|---|---|---|---|---|
| 8 k | None | 6820 6847 6869 6898 | 6820 6869 | 6820 6869 | None | NA | 6820 6833 6869 6887 6898 | 6820 6833 6869 6887 6898 |
| 16 k | 13636 13724 13790 13879 | 13636 13790 | 13636 13790 | 13636 13790 | 13636 13790 | 13636 13790 | 13636 13724 13879 | 13636 13724 13879 |
| 32 k | NA | 27268 27688 | | 27268 27688 | NA | 27268 27368 27448 27688 27758 | 27268 27688 | 27268 27368 27448 27580 27688 27758 |

T280

RECEIVER, INTEGRATED CIRCUIT, RECEIVING METHOD, AND PROGRAM

TECHNICAL FIELD

The present invention relates to a receiver, an integrated circuit, a receiving method, and a program, and in particular, to a receiver, an integrated circuit, a receiving method, and a program that are provided with a demodulator for demodulating a modulation wave modulated according to orthogonal frequency division multiplexing (OFDM).

BACKGROUND ART

In various types of current digital communication such as terrestrial digital broadcasting, IEEE802.11a and the like, orthogonal frequency division multiplexing (OFDM) has been widely adopted as a transmission method.

An exemplary OFDM receiver generates reliability information by using calculated noise power, and utilizes the reliability information to enable high-accuracy error correction using an LDPC (Low Density Parity Check) code (for example, PTL 1). According to the technique disclosed in PTL 1, specifically, for noise power calculated from pilot signals or an OFDM band spectrum, average noise power in a symbol direction is compared with noise power in each symbol, and in the case where the noise power in each symbol exceeds a predetermined threshold, it is determined that impulse interference exists, and a value of the noise power in each symbol is used to generate the reliability information. On the contrary, in the case where the noise power in each symbol does not exceed the predetermined threshold, it is determined that the impulse interference does not exist, and a value of the average noise power in the symbol direction is used to generate the reliability information. Thereby, even when the noise power locally increases, proper reliability information can be generated, improving an LDPC decoding performance. However, PTL 1 fails to mention a specific method of calculating the noise power in units of symbol.

Here, the impulse interference means an irregular and random interference signal. Since impulse noise occurs in an impulse manner from, for example, power-ON/OFF of household electrical appliances, lighting equipment or automobile ignition, the noise power locally increases in the symbol in which the impulse noise exists.

There is a method of estimating the noise power existing in each symbol, which is necessary for estimating the reliability information (for example, PTL 2). PTL 2 describes that, in ISDB-T (Integrated Services Digital Broadcasting-Terrestrial) as Japanese terrestrial digital broadcasting, either or both TMCC (Transmission Multiplexing Configuration Control) signals and AC (Auxiliary Channel) signals, which are continuously inserted into a predetermined subcarrier in a time direction are used to estimate the reception quality.

CITATION LIST

Patent Literature

[PTL 1] European Patent Application Publication No. 2242226
[PTL 2] Japanese Patent No. 3740468

SUMMARY OF INVENTION

Technical Problem

The conventional noise power calculation methods disadvantageously depend on a frame structure. For example, to use the noise power calculation method disclosed in PTL 2, it is need to arrange a signal that can be used to calculate the noise power, such as a TMCC signal, in each OFDM symbol. Thus, whether or not the noise power calculation method in PTL 2 can be applied depends on the frame structure of a received signal.

Therefore, an object of the present invention is to provide a receiver and the like capable of estimating the reliability information without depending on the received frame structure.

Solution to Problem

To attain the above-mentioned object, a receiver in accordance with one aspect of the present invention is a receiver including: a demodulator that demodulates a modulation wave modulated according to orthogonal frequency division multiplexing (OFDM), the demodulator including: an interference wave detector that detects that a received modulation wave which is received by the receiver includes an interference wave when received power of each sample of the received modulation wave exceeds a threshold, and upon the detection, executes replacement processing of replacing a received signal exceeding the threshold with a predetermined value; a first interference wave power estimation unit configured to estimate interference wave power included in an OFDM symbol included in the received modulation wave on the basis of the number of samples that have been subjected to the replacement processing in the OFDM symbol; and a demodulated data generator that demodulates the received modulation wave by executing demodulation processing of demodulating the received modulation wave that has been subjected to the replacement processing by the interference wave detector on the basis of the interference wave power estimated by the first interference wave power estimation unit, to generate demodulation data.

Advantageous Effects of Invention

According to the above-mentioned aspect, by calculating the interference power on the basis of the number of samples exceeding the predetermined threshold during the OFDM symbol period, the interference power can be calculated without depending on the received frame structure, thereby enabling stable reception.

BRIEF DESCRIPTION OF DRAWINGS

FIG. 3B A view showing an example of an interference wave detection signal.

FIG. 22 A view illustrating the carrier interval and the symbol interval in each pilot (SP) pattern.

FIG. 24 A view illustrating values of the CP groups (CP_g1, CP_g2, CP_g3) for the pilot patterns.

FIG. 25 A view illustrating values of the CP group (CP_g4) for the pilot patterns.

FIG. 26 A view illustrating values of the CP group (CP_g5) for the pilot patterns.

FIG. 27 A view illustrating values of the CP group (CP_g6) for the pilot patterns.

FIG. 28 A view illustrating CP carrier positions added in an Extended mode.

DESCRIPTION OF EMBODIMENTS (Findings as a Basis for the Present Invention)

Prior to description of embodiments of the present invention, digital television broadcasting adopting an OFDM technology as an example of a system to which the present invention can be applied will be described with reference to figures.

The OFDM technology is a method of transmitting a plurality of narrowband digital modulated signals on multiple frequencies by using a plurality of subcarriers orthogonal to each other, which is excellent in frequency use efficiency.

According to the OFDM technology, one symbol section is composed of an effective symbol section and a guard interval section, for the periodicity in the symbol, some signals in the effective symbol section are copied and inserted into the guard interval section. This can reduce the effect of interference between symbols, which is caused by multipath interference, and has an excellent resistance to the multipath interference.

In recent years, analog television broadcasting has been stopped in various countries, and the frequency realignment has become active on a global scale. In Europe, in addition to SD (Standard Definition) broadcasting adopting DVB-T (Digital Video Broadcasting-Terrestrial), HD (High Definition) services are in increasingly demand. Under such situations, standardization of DVB-T2 as the second-generation European terrestrial digital broadcasting is progressing, and the service has already started in some countries.

Figures 18, 19:
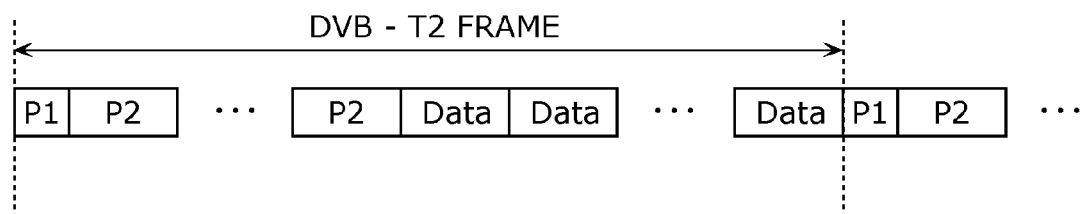
FIG. 18 A schematic view illustrating a structure of a DVB-T2 frame in a DVB-T2 scheme.
FIG. 19 A view illustrating relationship between FFT size and the number of P2 symbols.

FIG. 18 shows a structure of a DVB-T2 frame in the DVB-T2 scheme. The DVB-T2 frame is composed of P1 symbols, P2 symbols, and data symbols.

The P1 symbol has a FFT (Fast Fourier Transform) size of 1 k (=1024), and contains information: (1) a format of the P2 symbol and the data symbol (MISO (Multi-Input-Single-Output) or SISO (Single-Input-Single-Output)), (2) the FFT size of the P2 symbol and the data symbol, (3) whether or not FEF (Future Extension Frames) is included, and so on.

The P2 symbol has the same FFT size as the data symbol, and pilots are inserted into the P2 symbol at regular intervals. In the case of the FFT size of 32 K and the SISO mode, the P2 pilot exists every six subcarriers. In the case of other parameters, the P2 pilot exists every three subcarriers. All transmission parameter information necessary for reception, such as a pilot pattern of the data symbols and a carrier extended mode (Extended mode or Normal), the number of symbols in each frame, and modulation method, is added to the P2 symbol. As shown in a table T190 in FIG. 19, the number of P2 symbols is set for each FFT size of the P2 symbols.

Figure 20:
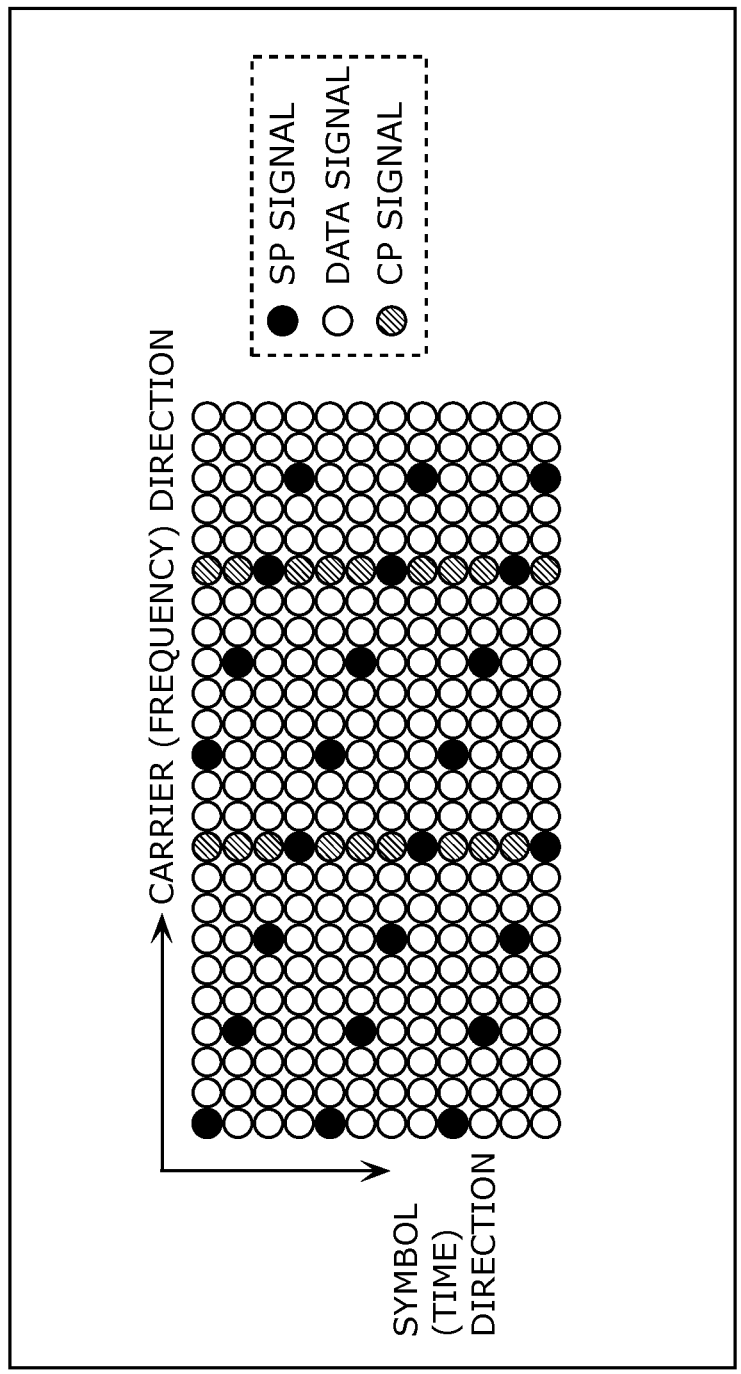
FIG. 20 A schematic view illustrating a transmission format (carrier arrangement) in the DVB-T2 scheme.
Figure 21:
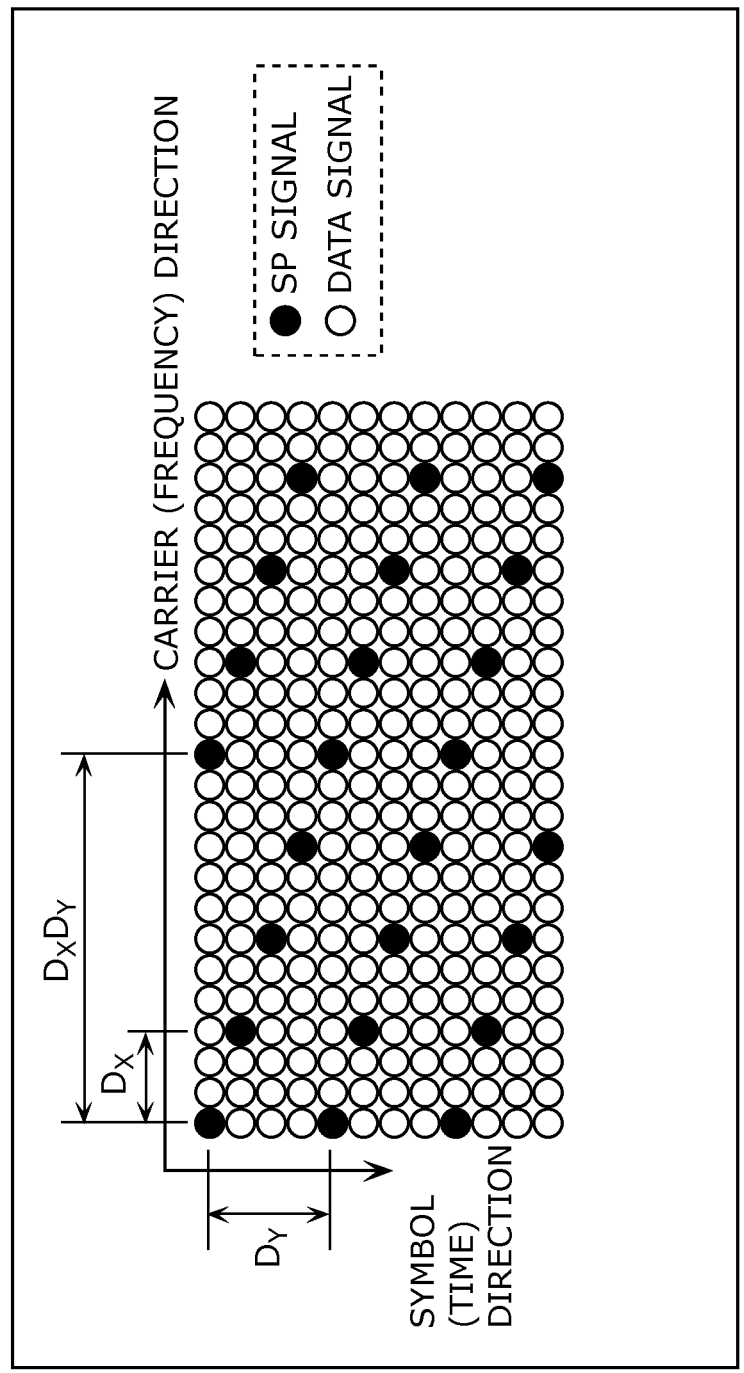
FIG. 21 A schematic view illustrating definition of a carrier interval of SP signals and a symbol interval.

FIG. 20 shows a transmission format of the DVB-T2 scheme. A horizontal axis represents an OFDM carrier (frequency) direction, and a vertical axis represents an OFDM symbol (time) direction. As shown in FIG. 20, an SP (Scattered Pilot) signals is inserted between data signals at regular intervals in the symbol direction and the carrier direction. CP (Continual Pilot) signals are successively inserted in particular subcarriers in the time direction. There are provided eight types of insertion patterns of the SP signals: PP1 to PP8, and the different patterns have different insertion intervals in the symbol direction and the carrier direction. As shown in FIG. 21, assuming that a carrier interval and a symbol interval of carrier positions where the SP signals exist are Dx and Dy, respectively, the insertion interval Dy in the symbol direction and an insertion interval (Dx·Dy) in the carrier direction, according to each of the SP patterns PP1 to PP8 are shown in a table T220 in FIG. 22. The subcarrier position where the CP signals are inserted is determined depending on the FFT size and the SP patterns.

Figure 23:
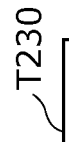
FIG. 23 A view illustrating the FFT size, used CP groups, and values used in a modulo operation.
Figure 26:
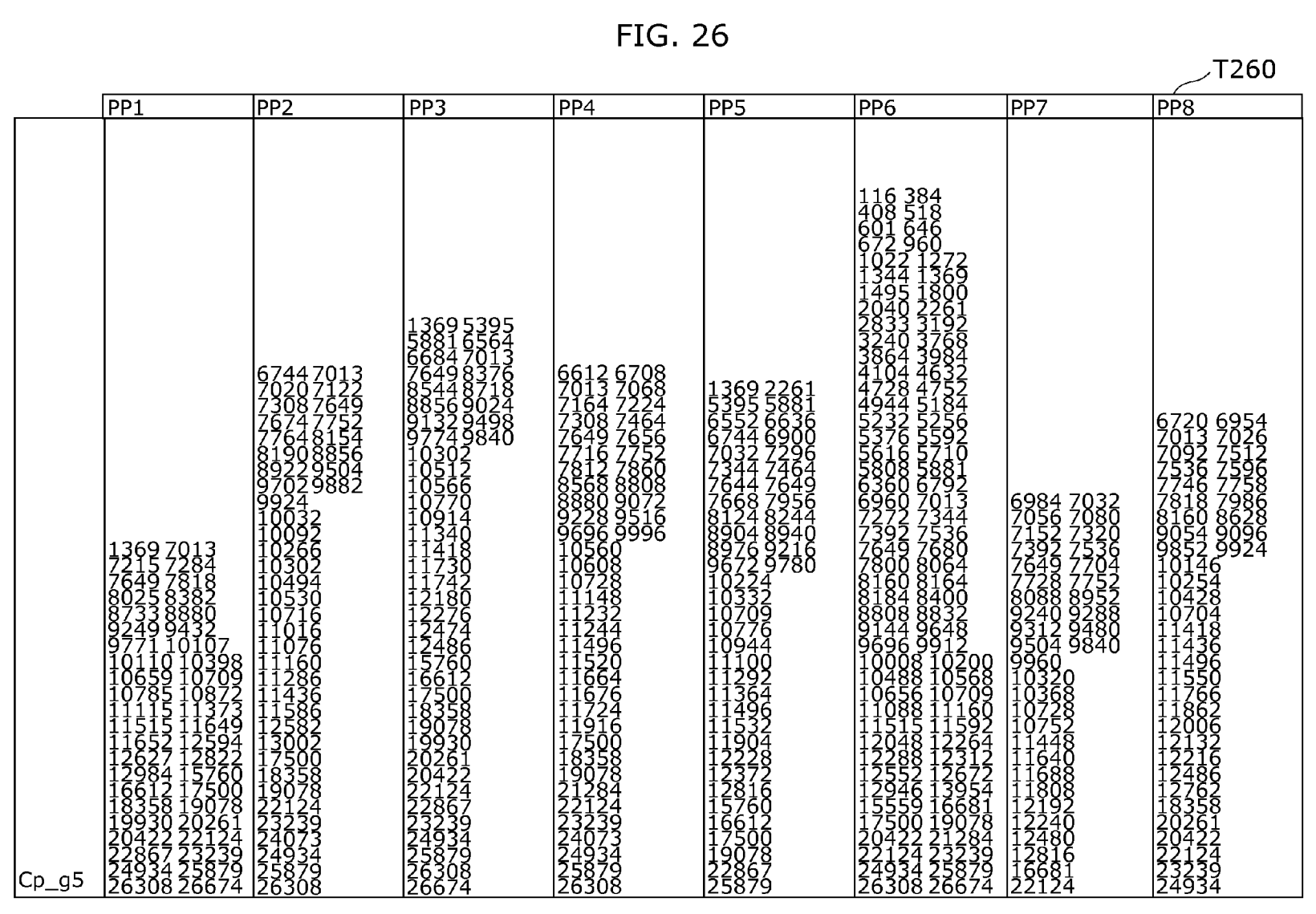
Figure 27:
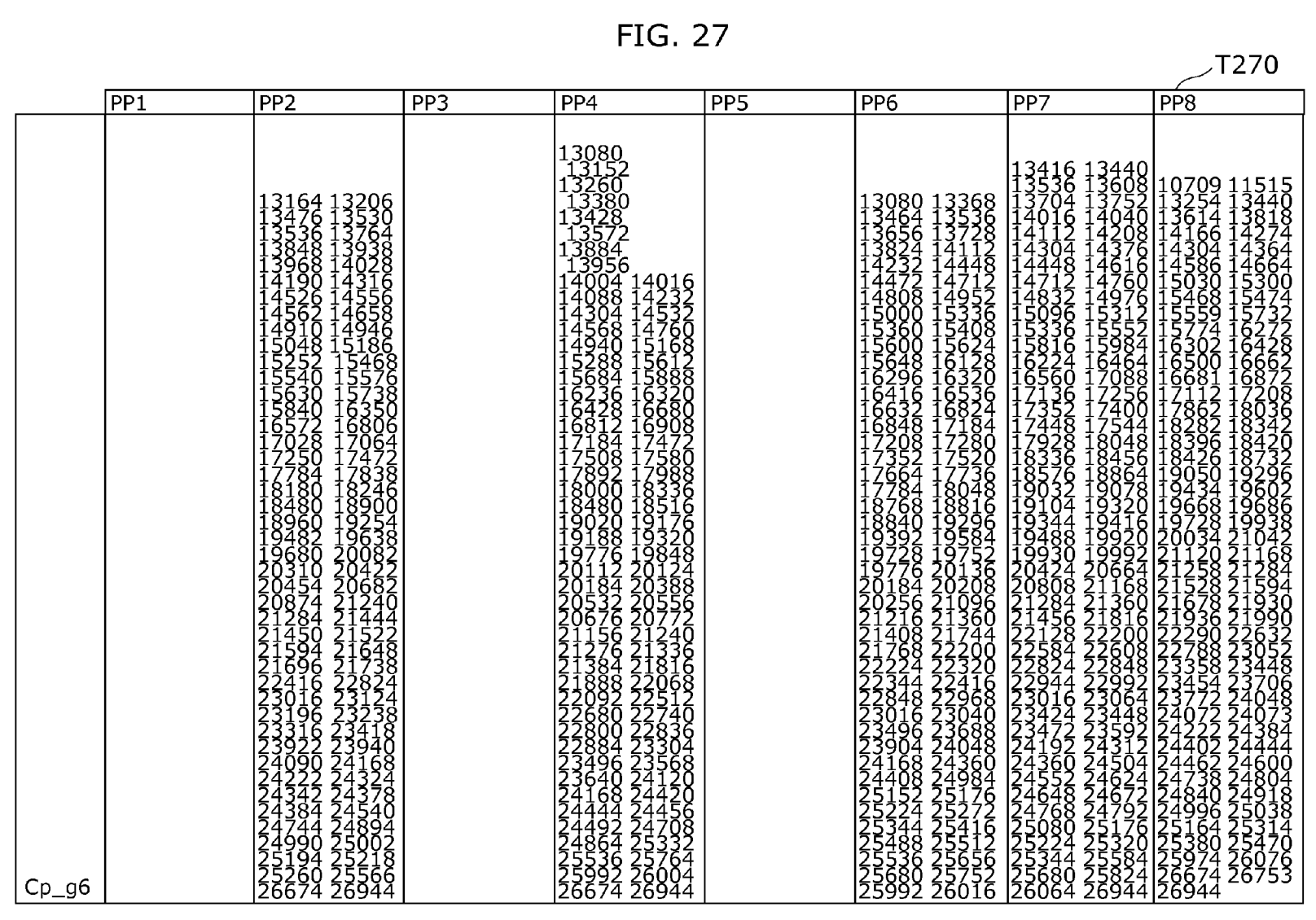

T230 in FIG. 23, and T240, T250, T260, T270 and T280 in FIG. 24 to FIG. 28, respectively, show positions of the CP signals. FIG. 23 shows which of groups CP_g1 to CP_g6 shown in FIG. 24 to FIG. 28 is used according to the FFT size. Values obtained by applying a modulo operation (residue operation) to values shown in FIG. 24 to FIG. 27 by using K_mod in FIG. 23 represent effective subcarrier numbers in which the CP signals exist. When the FFT size is 32 k, the modulo operation is not performed, and the values shown in FIG. 24 to FIG. 27 become the effective subcarrier numbers in which the CP signals exist as they are. In the case of the Extended mode, the effective subcarrier numbers shown in FIG. 28 are added. The values in FIG. 28 does not need to be subjected to the modulo operation.

Figure 29:
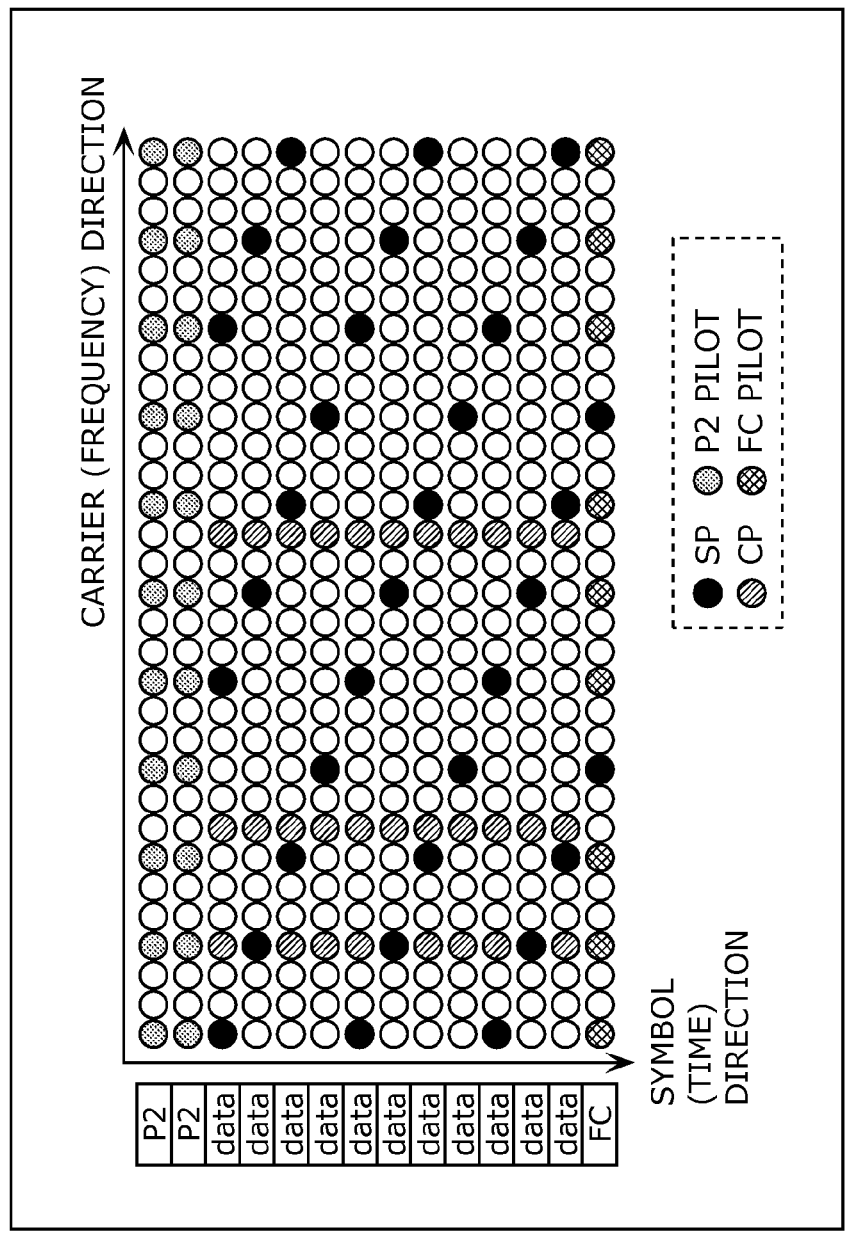
FIG. 29 A schematic view illustrating arrangement of pilot signals in each symbol.

Although the CP signals are successively inserted in the time direction, no CP signal exists in some symbols in an exceptional case. For example, no CP signal exists in the P2 symbol and a Frame Close symbol. In the case of the transmission format of SISO, either a normal symbol or the Frame Close symbol is set to the last symbol in the frame according to combination of the guide interval and the pilot pattern. In the case of the transmission format of MISO, the Frame Close symbol is set except for the pattern PPB. FIG. 29 is a schematic view showing a transmission format including the P2 symbols and the Frame Close symbol. As shown in FIG. 29, more pilots are inserted into the Frame Close (FC) symbol than pilots inserted into the normal data symbol. Thereby, in estimating channel characteristics of the pilot signals, the characteristics can be easily interpolated in the time axis direction. The added pilots other than the SP signals are called FC (Frame Close) pilots. In the Frame Close symbol, the FC pilots are added and no CP signal exists. Also in the P2 symbols, since a lot of P2 pilots exist, no CP signal exists.

Figure 30:
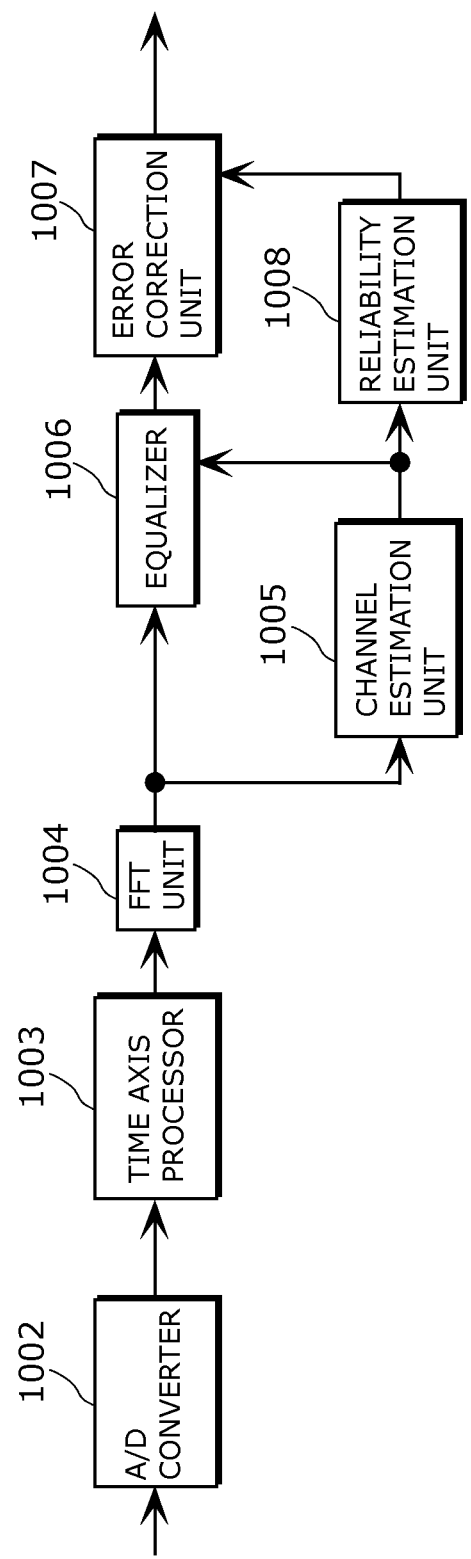
FIG. 30 A schematic view illustrating a general DVB-T2 receiver.

FIG. 30 shows an example of a schematic block diagram of an integrated structure according to conventional DVB-T2. As shown in FIG. 30, the reception structure according to the conventional DVB-T2 scheme includes an A/D converter 1002, a time axis processor 1003, an FFT unit 1004, a channel estimation unit 1005, an equalizer 1006, an error correction unit 1007, and a reliability estimation unit 1008.

The A/D converter 1002 decodes the P1 symbol from an A/D (analog-digital) converted signal.

The time axis processor 1003 synchronizes carrier frequencies and sampling frequencies of the P2 symbol and the data symbol.

The FFT unit 1004 performs FFT for conversion into a signal along the frequency axis.

The channel estimation unit 1005 estimates channel characteristics on the basis of the SP signal included in the signal that has been subjected to FFT.

The equalizer 1006 performs distortion compensation (equalization) of the signal that has been subjected to FFT.

The error correction unit 1007 performs error correction to decode data.

The reliability estimation unit 1008 estimates the reliability information in channel estimation. The estimated reliability information is used for the error correction in the error correction unit 1007.

The DVB-T2 employs an LDPC (Low Density Parity Check) code as an error correction code. To decode the LDPC code, the reliability information representing the reliability of data is necessary for weighting of log likelihood ratio. The reliability information is estimated based on signal power estimated in each symbol and noise power including the effect of thermal noise or interference wave. To improve the error correction performance in LDPC decoding, it is critically important to appropriately generate an integrated propagation state as the reliability information.

For example, PTL discloses a method of assessing the noise power existing in each symbol, which is necessary for estimating the reliability information. According to the technology disclosed in PTL 2, in the ISDB-T (Integrated Services Digital Broadcasting-Terrestrial) as the Japanese terrestrial digital broadcasting, the reception quality is assessed using at least either TMCC (Transmission Multiplexing Configuration Control) signals or AC (Auxiliary Channel) signals that are successively inserted into predetermined subcarriers in the time direction. Specifically, the reception quality is calculated from an error between signals obtained by equalizing the TMCC signals by use of the channel characteristics acquired from interpolation of the channel characteristics of the SP signals, and signals obtained by differential decoding and hard decision of the TMCC signals. In this case, since an integrated quality signal including the effect of deterioration due to an interpolation error is detected, high-accuracy noise estimation can be achieved. When it is attempted to apply the noise power calculation method described in PTL 2 to the DVB-T2, by using the CP signals in place of the TMCC signals, the symbol including the CP signals can be assessed. However, the symbol including no CP signal cannot be assessed by the same method.

An impulse interference environment is one of reception environments in which the state of the reception channel is hard to be reflected on the reliability information. The impulse interference is an irregular and random interference signal, and occurs in an impulse manner from power-ON/OFF of household electrical appliances, lighting equipment, or automobile ignition.

In OFDM decoding, the impulse interference is diffused into a wider frequency band by the FFT, thereby degrading the reception performance. The noise power locally increases in the symbol in which the interference wave exists. For this reason, when the noise power is averaged among the symbols for improving the accuracy of the noise power of the reliability information, in the symbol in which the impulse interference exists, an error occurs between the reliability information and the actual transmission environment.

According to a method of reducing such effect of the impulse interference environment, the reception performance is improved by eliminating a signal having an integrated level higher than a predetermined level. In this case, since an impulse interference component having a high reception level is eliminated, the impulse interference signal itself does not exist. However, the desired OFDM signal itself also disappears by eliminating the received signal to disappear, while a noise component generated with the elimination still remains. Thus, an error occurs between the reliability information obtained by equalizing the noise power among the symbols and the noise power in the symbol including the noise component remaining with the elimination, resulting in that the LDPC decoding performance cannot be used to the fullest extent.

Thus, for example, PTL 1 describes an effective method of eliminating such local difference in the reliability information of the symbols to improve the accuracy. According to the method described in PTL 1, for the noise power calculated from the pilot signal or an OFDM band spectrum, average noise power in a symbol direction is compared with noise power in each symbol, and in the case where the noise power in each symbol exceeds a predetermined threshold, it is determined that impulse interference exists, and a value of the noise power in each symbol is used to generate the reliability information. On the contrary, in the case where the noise power in each symbol does not exceed the predetermined threshold, it is determined that the impulse interference does not exist, and a value of the averaged noise power in the symbol direction is used to generate the reliability information. Thereby, even when the noise power is locally increased by the existence of the impulse interference or the elimination of the signal, the noise power can be correctly found. By generating high-accuracy reliability information in this manner, the LDPC decoding performance can be improved.

However, PTL 1 fails to disclose a specific method of calculating the noise power in units of symbol.

When it is attempted to apply the high-accuracy noise power calculation method in units of symbol, which is described in PTL 2, to the DVB-T2 scheme, as described above, by using the CP signals in place of the TMCC signals, the noise power of the frame including the CP signals can be calculated. However, in the DVB-T2 frame according to the DVB-T2 scheme, the CP signals are not arranged in the P2 symbol and the Frame Close symbol. In such symbols including no CP signal, the noise power cannot be calculated based on the CP signals and therefore, the average noise power in the symbol direction needs to be used in these symbols. As a result, when the impulse interference or signal elimination occurs in the symbols in which the noise power cannot be calculated in the units of symbol according to the conventional art, for example, because the CP signals are not arranged, a difference between the actual noise power of the current symbol and the average noise power of the current symbol and other symbols is generated, thereby lowering the accuracy of the reliability information used for the LDPC decoding to degrades the reception performance.

To solve the above problem, a receiver according to one aspect of the present invention is a receiver including: a demodulator that demodulates a modulation wave modulated according to orthogonal frequency division multiplexing (OFDM), the demodulator including: an interference wave detector that detects that a received modulation wave which is received by the receiver includes an interference wave when received power of each sample of the received modulation wave exceeds a threshold, and upon the detection, executes replacement processing of replacing a received signal exceeding the threshold with a predetermined value; a first interference wave power estimation unit configured to estimate interference wave power included in an OFDM symbol included in the received modulation wave on the basis of the number of samples that have been subjected to the replacement processing in the OFDM symbol; and a demodulated data generator that demodulates the received modulation wave by executing demodulation processing of demodulating the received modulation wave that has been subjected to the replacement processing by the interference wave detector on the basis of the interference wave power estimated by the first interference wave power estimation unit, to generate demodulation data.

Thus, the receiver calculates the interference wave power included in the OFDM symbol on the basis of the number of samples in which the received power exceeds the predetermined threshold in the OFDM symbol, thereby enabling estimation of the interference wave power in units of the OFDM symbol without depending on the type of signal transmitted in the OFDM symbol. As a result, in the demodulation processing, the interference wave power calculated on the basis of the number of samples in which the received power exceeds the predetermined threshold can be used as the interference wave power of the OFDM symbol including no CP signal, even when impulse interference or signal elimination exists in the OFDM symbol including no CP signal, stable reception can be achieved.

That is, according to the conventional noise power detection method using the CP signals included in the OFDM symbol, the interference wave power of the OFDM symbol including particular signals can be estimated by using the particular signals. On the contrary, according to the present invention, the interference wave power in units of OFDM symbol can be estimated without depending on the type of signal transmitted in the OFDM symbol.

For example, the demodulated data generator may include a reliability estimation unit configured to estimate reliability information with respect to the received modulation wave to obtain a lower reliability of the OFDM symbol as the interference wave power estimated by the first interference wave power estimation unit is larger; and an error correction unit configured to execute error correction processing of correcting an error included in the received modulation wave on the basis of the reliability information estimated by the reliability estimation unit, as the demodulation processing for the received modulation wave, to generate the demodulation data for the received modulation wave.

Thus, in the demodulation processing, whether or not noise in the symbol can be estimated according to the noise power detection method using the CP signals, noise power taking into account the estimated interference power can be estimated. As a result, even when impulse interference or signal elimination exists, error correction can be performed based on the high-accuracy reliability information, thereby enabling stable reception.

For example, the error correction unit may be configured to execute weighting processing of a log likelihood ratio in LDPC (Low Density Parity Check) demodulation on the basis of the reliability information estimated by the reliability estimation unit, as the demodulation processing for the received modulation wave, to generate demodulation data for the received modulation wave.

Thus, the LDPC (Low Density Parity Check) demodulation processing can be executed based on the high-accuracy reliability information. In the LDPC demodulation processing, the inputted reliability information can be taken into account, and by inputting the high-accuracy reliability information, higher-accuracy demodulation processing can be achieved.

For example, the demodulated data generator may include: an FFT (Fast Fourier Transform) window position detector that identifies a start timing of the OFDM symbol included in the received modulation wave; and an FFT unit configured to apply FFT processing to the received modulation wave on the basis of the start timing of the OFDM symbol, which is identified by the FFT window position detector, and applies the demodulation processing to the received modulation wave that has been subjected to the FFT processing, to generate the demodulation data.

Thus, impulse interference or signal elimination that exists during the actually Fourier-transformed symbol period can be estimated.

For example, the interference wave detector may execute, as the replacement processing, processing of replacing the received signal exceeding the threshold with 0 as the predetermined value.

Thus, by setting the sample having the interference wave to 0, residues of the interference power can be reduced, thereby enabling stable reception.

For example, the interference wave detector may execute processing of replacing the received signal exceeding the threshold with the threshold as the predetermined value.

Thus, by setting the sample having the interference wave to the predetermined value, residues of the interference power can be reduced.

For example, the demodulator further may include a second interference wave power estimation unit configured to estimate interference wave power included in a first OFDM symbol included in the received modulation wave on the basis of interference wave power included in a second OFDM symbol that is different from the first OFDM symbol and magnitude of an effect on the first OFDM symbol, which is brought by the interference wave power included in the second OFDM symbol, and the demodulated data generator applies demodulation processing including error correction taking into account the interference wave power estimated by the first interference wave power estimation unit to a first OFDM symbol group having at least one OFDM symbol included in the received modulation wave to generate demodulation data for the received modulation wave, and applies demodulation processing including error correction taking into account the interference wave estimated by the second interference wave power estimation unit to a second OFDM symbol group having an OFDM symbol that is the OFDM symbol included in the received modulation wave other than the OFDM symbol of the first OFDM symbol group, to generate the demodulation data for the received modulation wave.

Thus, the interference wave power can be calculated according to the proper interference wave power method selected from the plurality of interference wave power estimation methods for each symbol, and the calculated interference wave power can be used in the demodulation processing to achieve effective demodulation, thereby enabling stable reception.

For example, the receiver may receive an airwave based on a Digital Video Broadcasting-Terrestrial 2 (DVB-T2) scheme as the modulation wave, and the demodulated data generator may use an OFDM symbol group including no OFDM symbol having a CP (Continual Pilot) signal as the first OFDM symbol group, to generate the demodulation data for the received modulation wave.

Thus, by calculating the interference power on the basis of the number of samples exceeding the predetermined threshold during the OFDM symbol period, the interference power can be calculated in even the symbol, to which the processing using the CP signals can be applied, and the calculated interference power can be used in the demodulation processing to achieve effective demodulation, thereby enabling stable reception.

For example, the demodulated data generator may use an OFDM symbol group including an OFDM symbol having a P2 symbol or an FC (Frame Close) symbol according to the DVB-T2 scheme as the first OFDM symbol group, to generate the demodulation data for the received modulation wave.

Thus, by calculating the interference power on the basis of the number of samples exceeding the predetermined threshold during the OFDM symbol period, the interference power can be calculated in even the P2 symbol or the FC symbol, to which the processing using the CP signals can be applied, and the calculated interference power can be used in the demodulation processing to achieve effective demodulation, thereby enabling stable reception.

For example, the demodulated data generator may further include a channel estimation unit configured to estimate channel characteristics of the modulation wave on the basis of the interference wave power estimated by the first interference wave power estimation unit, and the demodulated data generator may demodulate the received modulation wave by executing demodulation processing based on the channel characteristicss estimated by the channel estimation unit, to generate the demodulation data.

Thus, by calculating the interference power on the basis of the number of samples exceeding the predetermined threshold during the OFDM symbol period, the interference power can be calculated whether or not noise in the symbol can be estimated, and the calculated interference power can be used to achieve effective channel estimation, thereby enabling stable reception.

For example, the channel estimation unit may include a plurality of different channel estimation interpolation units that perform mutually different methods of interpolating the channel characteristicss, the first interference wave power estimation unit may be configured to estimate interference power corresponding to each of the channel estimation interpolation units, and the channel estimation unit may be configured to output one of outputs from the plurality of channel estimation interpolation units as the channel characteristicss on the basis of the interference power estimated by the first interference wave power estimation unit.

Thus, by calculating the interference power on the basis of the number of samples exceeding the predetermined threshold during the OFDM symbol period, the interference power can be calculated whether or not noise in the symbol can be estimated, and the calculated interference power can be used to achieve effective channel estimation, thereby enabling stable reception.

For example, the first interference wave power estimation unit may be configured to calculate interference wave power included in the OFDM symbol included in the received modulation wave, using the number of samples that have been subjected to the replacement processing in the OFDM symbol, the number of FFT samples in the OFDM symbol, and a predetermined coefficient.

Thus, the interference power can be calculated based on the number of samples exceeding the predetermined threshold during the OFDM symbol period, the number of FFT samples, and the predetermined coefficient with high accuracy, and the calculated interference power can be used to achieve effective demodulation, thereby enabling stable reception.

For example, the demodulated data generator may further include a channel estimation unit configured to estimate a channel characteristic of each carrier included in a fourth OFDM symbol disposed before or after a third OFDM symbol included in the received modulation wave by interpolation using channel characteristicss calculated using a pilot signal included in the third OFDM symbol, an equalizer configured to execute equalization processing of correcting a signal of the fourth OFDM symbol on the basis of the channel characteristicss estimated by the channel estimation unit, an error correction unit configured to perform error correction for the signal corrected by the equalizer on the basis of reliability information representing reliability of the signal corrected by the equalizer, and a reliability information estimation unit configured to estimate reliability information of the signal included in the fourth OFDM symbol on the basis of interference wave power of the third OFDM symbol, which is estimated by the interference wave power estimation unit.

Thus, by calculating the interference power on the basis of the number of samples exceeding the predetermined threshold during the OFDM symbol period, the interference power can be calculated whether or not noise in the symbol can be estimated, and the calculated interference power can be used to achieve effective channel estimation of other OFDM symbols, thereby enabling stable reception.

An integrated circuit according to one aspect of the present invention is an integrated circuit including a demodulator that demodulates a modulation wave modulated according to orthogonal frequency division multiplexing (OFDM), the demodulator including: an interference wave detector that detects that a received modulation wave that is the modulation wave received by the receiver includes interference wave when received power of each sample of the received modulation wave exceeds a threshold, and upon the detection, executes replacement processing of a replacing received signal exceeding the threshold with a predetermined value; a first interference wave power estimation unit configured to estimate interference wave power included in an OFDM symbol included in the received modulation wave on the basis of the number of samples that have been subjected to the replacement processing; and a demodulated data generator that demodulates the received modulation wave by executing demodulation processing of demodulating the received modulation wave that has been subjected to the replacement processing by the interference wave detector on the basis of the interference wave power estimated by the first interference wave power estimation unit, to generate demodulation data.

Thus, the integrated circuit has the same effect as the above-mentioned receiver.

A receiving method according to one aspect of the present invention is a receiving method comprising demodulating a modulation wave modulated according to orthogonal frequency division multiplexing (OFDM), wherein the demodulating includes: an interference wave detection step of detecting that received modulation wave that is the modulation wave received according to the receiving method includes interference wave when received power of each sample of the received modulation wave exceeds a threshold, and upon the detection, executing replacement processing of replacing a received signal exceeding the threshold with a predetermined value; a first interference wave power estimation step of estimating interference wave power included in an OFDM symbol included in the received modulation wave on the basis of the number of samples that have been subjected to the replacement processing; and a demodulation data generation step of demodulating the received modulation wave by executing demodulation processing of demodulating the received modulation wave that has been subjected to the replacement processing in the detecting on the basis of the interference wave power estimated in the estimating, to generate demodulation data.

Thus, the receiving method has the same effect as the above-mentioned receiver.

A program as one aspect of the present invention causes a computer to perform the above-mentioned receiving method.

Thus, the program has the same effect as the above-mentioned receiver.

These general and specific aspects may be realized by a system, a method, an integrated circuit, a computer program, or a recording medium, or may be realized by any combination of a system, a method, an integrated circuit, a computer program, and a recording medium.

Embodiments of the present invention will be described below with reference to figures.

The following embodiments are specific examples of the present invention. Values, shape, materials, components, position and connection of the components, steps, and the order of the steps are merely examples, and do not intend to limit the present invention. Among components in the following embodiments, components that are not described in independent claims defining the highest concept are described as optional components.

First Embodiment

First embodiment of a receiver from one aspect of the present invention will be described below with reference to FIG. 1 to FIG. 6. The DVB-T2 scheme as the 2nd-generation European terrestrial digital broadcasting standard is used herein as an example.

Figure 1:
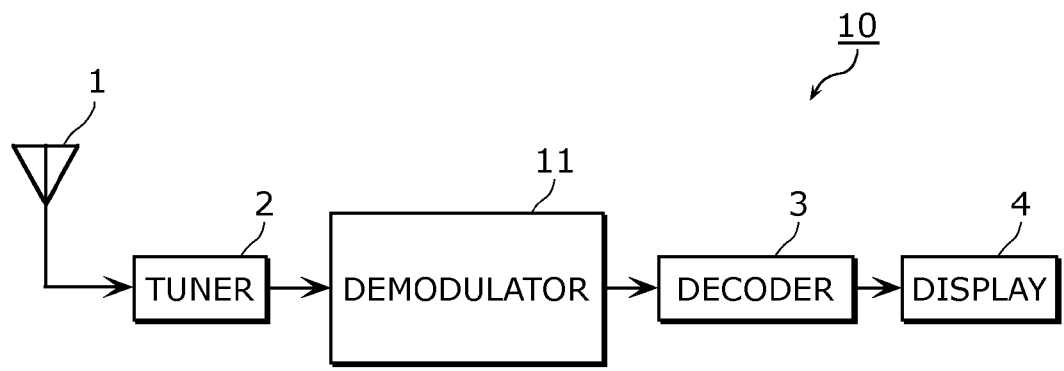
FIG. 1 A block diagram showing a configuration of a receiver in accordance with First embodiment.

FIG. 1 is a block diagram showing a receiver 10 in First embodiment of the present invention. The receiver 10 includes an antenna 1, a tuner 2, a demodulator 11, a decoder 3, and a display 4.

The antenna 1 receives a modulation wave modulated according to orthogonal frequency division multiplexing (OFDM). Airwave based on the DVB-T2 scheme is an example of the modulation wave modulated according to the orthogonal frequency division multiplexing (OFDM).

The tuner 2 selects a received signal of a desired reception channel from the modulation wave received by the antenna 1.

The demodulator 11 demodulates the received analog signal selected by the tuner 2.

The decoder 3 decodes the signal that is demodulated by the demodulator 11 and compressed according to the H.264 or the like.

The display 4 outputs video/voice decoded by the decoder 3.

Figure 2:
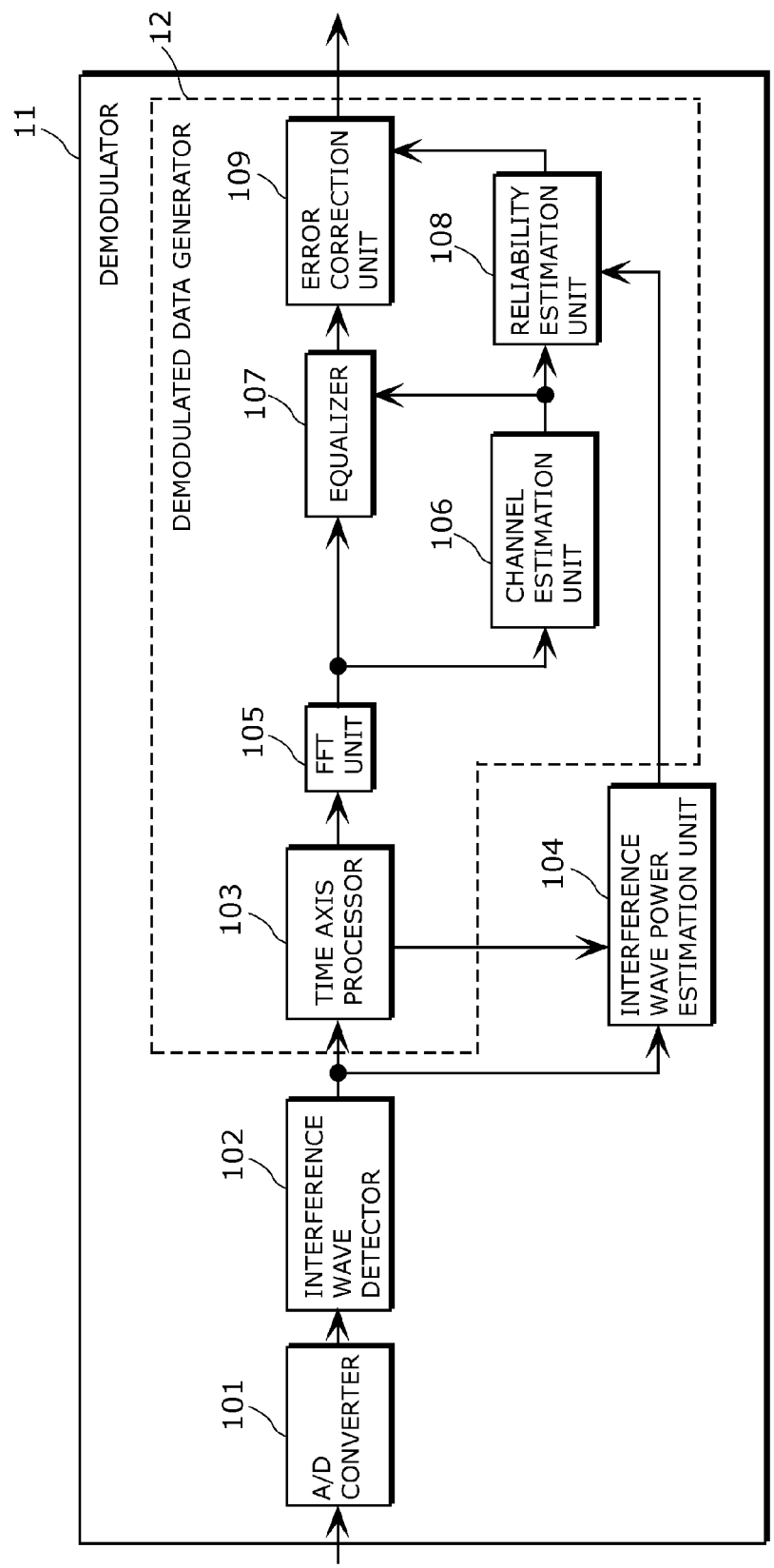
FIG. 2 A block diagram showing a configuration of a demodulator 11 in accordance with First embodiment.

FIG. 2 is a block diagram showing a configuration of the demodulator 11 in accordance with First embodiment. The demodulator 11 includes an A/D converter 101, an interference wave detector 102, an interference wave power estimation unit 104, and a demodulated data generator 12. The demodulated data generator 12 includes a time axis processor 103, an FFT unit 105, a channel estimation unit 106, equalizer 107, reliability estimation unit 108, and an error correction unit 109.

The A/D converter 101 converts the analog output signal from the tuner 2 into a digital signal, and outputs the digital signal to the interference wave detector 102.

The interference wave detector 102 detects an interference wave contained in the received signal converted into the digital signal by the A/D converter 101 and outputs a detection result to the interference wave power estimation unit 104 as well as converts the received signal (sample) containing the detected interference wave into a predetermined value and outputs the predetermined value to the time axis processor 103. Specific processing will be described later.

The time axis processor 103 determines a start time position of FFT processing during the OFDM symbol period (hereinafter referred to as FFT window position) for the output signal of the interference wave detector 102, outputs the start time position to the FFT unit 105, and outputs the FFT window position information to the interference wave power estimation unit 104.

The interference wave power estimation unit 104 estimates interference power on the basis of the received signal that has been subjected to the interference wave processing by the interference wave detector 102 and the FFT window position information determined by the time axis processor 103. The interference wave power estimation unit 104 corresponds to the first interference wave power estimation unit. Specific processing performed by the interference wave power estimation unit 104 will be described later.

The FFT unit 105 Fourier-transforms the output signal from the time axis processor 103 into a signal along the frequency axis on the basis of an FFT window position signal, and outputs the Fourier-transformed signal to the channel estimation unit 106 and the equalizer 107.

The channel estimation unit 106 interpolates channel characteristics obtained by dividing the SP signals contained in the signal Fourier-transformed according to FFT by known SP signals, thereby estimating the channel characteristicss in all subcarriers, and outputs the estimated channel characteristics to the equalizer 107 and the reliability estimation unit 108.

The equalizer 107 corrects phase and amplitude distortion of the output signal from the FFT unit 105, which is generated in the channel, on the basis of the channel characteristics estimated by the channel estimation unit 106.

The reliability estimation unit 108 finds the noise power on the basis of a channel estimated value estimated by the channel estimation unit 106 and the interference power estimated by the interference wave power estimation unit 104, and generates reliability information to be used in the error correction unit 109 from the noise power.

The error correction unit 109 corrects an error of the signal corrected by the equalizer 107 on the basis of the reliability information estimated by the reliability estimation unit 108.

Figure 3A:
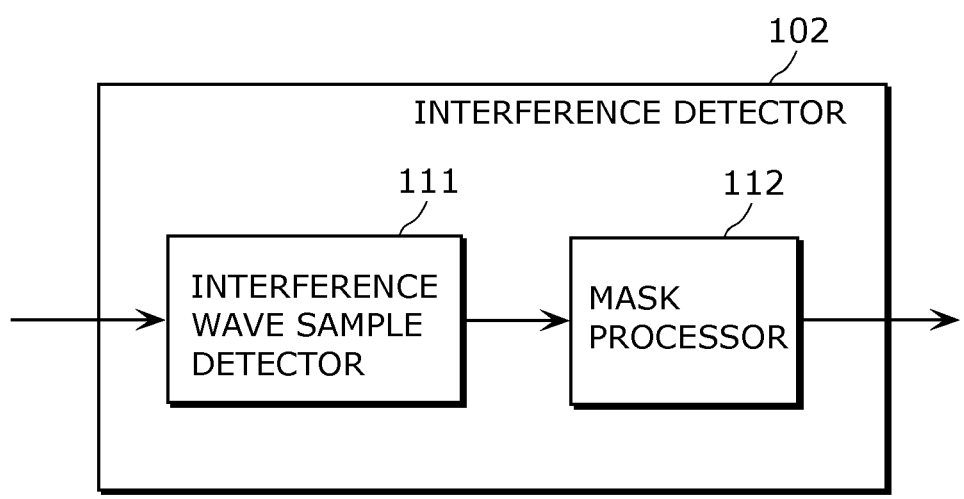
FIG. 3A A block diagram showing a configuration of an interference wave detector 102 in accordance with First embodiment.

FIG. 3A is a view showing a configuration of the interference wave detector 102. FIG. 3B shows an example of an interference wave detection signal.

As shown in FIG. 3A, the interference wave detector 102 includes an interference wave sample detector 111 and a mask processor 112.

The interference wave sample detector 111 compares the received signal ((a) in FIG. 3B) converted into the digital signal by the A/D converter 101 with a predetermined threshold, generates a signal representing a sample position exceeding the threshold value, and outputs the signal representing the sample position together with the received signal to the mask processor 112. A following interference wave detection signal (Interference Exist) ((b) in FIG. 3B) can be used as the signal representing the sample position exceeding the threshold value. That is, for the sample having the received signal level (received power) exceeding the threshold level, the interference wave detection signal outputs Interference Exist=1 (interference wave exists). For the sample having the received signal level that does not exceed the threshold level, the interference wave detection signal outputs Interference Exist=0 (interference wave does not exist). That the received signal level exceeds the threshold includes both cases of positive sign and negative sign. That is, that a threshold $T_h$ is larger than 0 includes the cases where the positive (>0) received signal level is larger than the threshold $T_h$ and where the negative (<0) received signal level is smaller than the negative threshold ($-T_h$).

In the sample of Interference Exist=1 (interference wave exists) as a detection result of the interference wave, the mask processor 112 replaces the received signal with 0 ((c) in FIG. 3B), and outputs 0 together with the interference wave detection signal to the time axis processor 103 and the interference wave power estimation unit 104.

Figure 4:
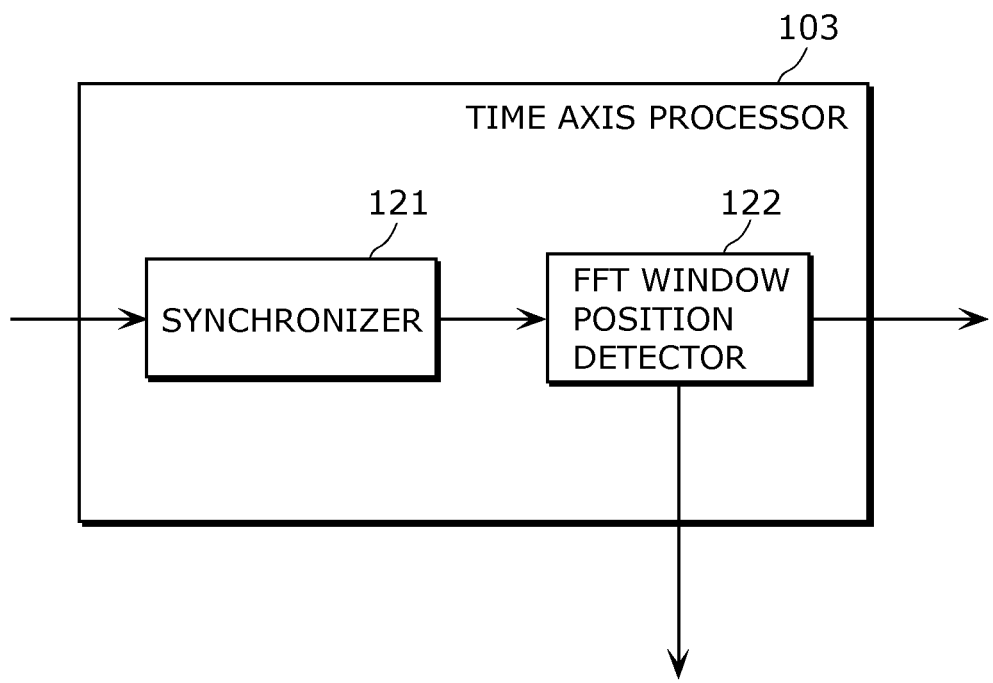
FIG. 4 A block diagram showing a configuration of a time axis processor 103 in accordance with First embodiment.

FIG. 4 shows a configuration of the time axis processor 103. The time axis processor 103 includes a synchronizer 121 and an FFT window position detector 122. The synchronizer 121 frequency-converts an output signal from the interference wave detector 102 into a baseband signal, synchronizes the carrier frequency with the sampling frequency, and outputs the baseband signal to the FFT window position detector 122. For Fourier transformation of the time axis signal, the FFT window position detector 122 determines the FFT window position of the OFDM symbol, and outputs the FFT window position to the FFT unit 105 and the interference wave power estimation unit 104.

Figure 5:
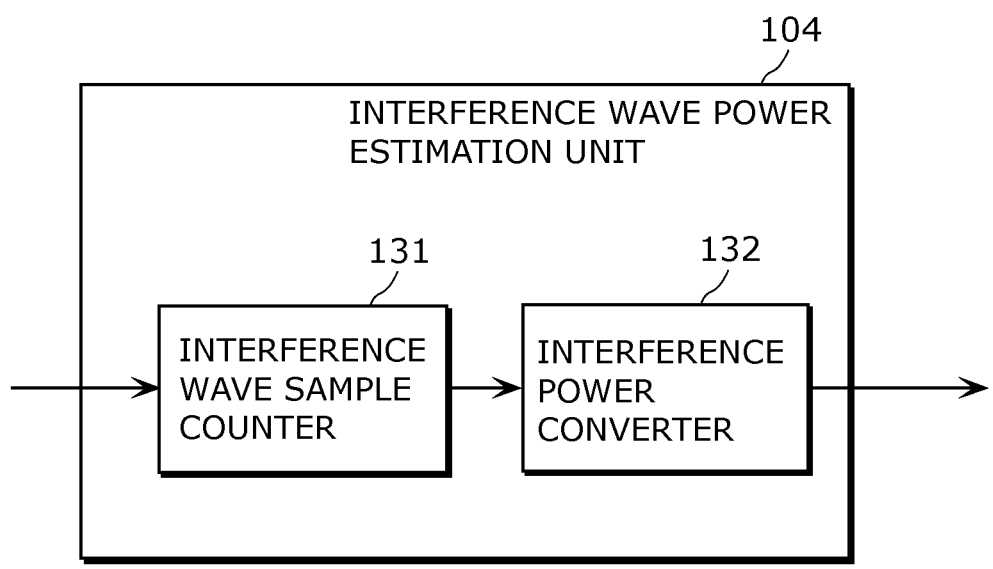
FIG. 5 A block diagram showing a configuration of an interference wave power estimation unit 104 in accordance with First embodiment.

FIG. 5 shows a configuration of the interference wave power estimation unit 104. The interference wave power estimation unit 104 includes an interference wave sample counter 131 and an interference power converter 132.

For the interference wave detection signal detected by the interference wave detector 102, the interference wave sample counter 131 outputs the number of samples determined as "interference wave exists" in the OFDM symbol section during which the FFT processing is executed, by using the FFT window position information detected by the FFT window position detector 122, to the interference power converter 132.

Using the number of samples of "interference wave exists" in the OFDM symbol section, which is counted by the interference wave sample counter 131, the interference power converter 132 estimates interference power existing in the OFDM symbol, and outputs the estimated interference power to the reliability estimation unit 108. Detailed operations of each unit will be sequentially described.

Since the interference wave detector 102 performs the masking processing of replacing the received signal level of the samples of "interference wave exists" with 0, the number of interference wave samples is equal to noise amount increased by eliminating the OFDM signal. For this reason, given that the OFDM signal power is $P_{OFDM}$, the signal level of each sample of the OFDM signal becomes $P_{OFDM}/N_{FFT}$. Thus, when the noise amount increased in the OFDM symbol is defined as $I_{mask}$ on the basis of the number of samples $N_I$ of the "interference wave exists" included in the OFDM symbol, $I_{mask}$ can be expressed by (Equation 1).

$$I_{mask} = N_I \times P_{OFDM}/N_{FFT} \quad \text{(Equation 1)}$$

The interference power converter 132 estimates the noise amount increased in each OFDM symbol according to the conversion formula (Equation 1), and outputs the estimated noise amount to the reliability estimation unit 108, thereby increasing the accuracy of the reliability information to improve the reception performance.

Figure 6:
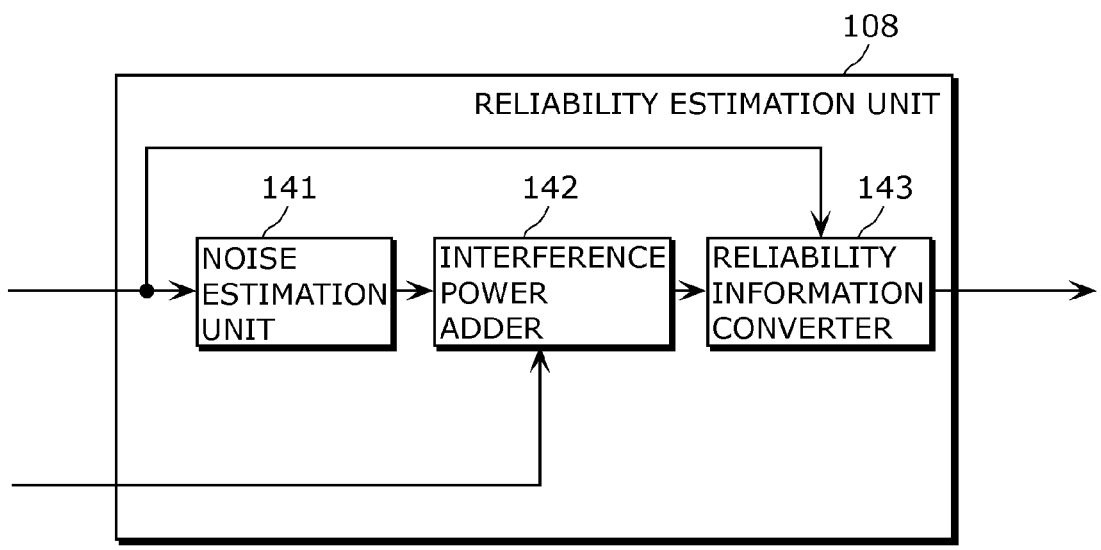
FIG. 6 A block diagram showing a configuration of a reliability estimation unit 108 in accordance with First embodiment.

FIG. 6 is a view showing a configuration of the reliability estimation unit 108. The reliability estimation unit 108 shown in FIG. 6 includes a noise estimation unit 141, an interference power adder 142, and a reliability information converter 143.

From the Fast-Fourier-Transformed signal, the channel characteristics estimated by the channel estimation unit 106, and known CP signal, the noise estimation unit 141 estimates an average noise power value among the OFDM symbols (average noise power among the symbols) on the basis of the received CP signal.

The interference power adder 142 adds the interference power estimated by the interference wave power estimation unit 104 to the estimated average noise power value among the symbols, and outputs the noise power for each symbol taking into account the effect of the interference wave.

The reliability information converter 143 estimates the reliability information to be used for LDPC decoding on the basis of the OFDM signal power based on the channel characteristics, which is estimated by the channel estimation unit 106, and the noise power calculated by the interference power adder 142, and outputs the reliability information to the error correction unit 109 to achieve effective error correction.

To estimate noise in the noise estimation unit 141, for example, the configuration described in PTL 1, in which the TMCC signals are replaced with the CP signals, is adopted. Specifically, a known CP signal $X_{CP}$ is compared with a received signal $Y_{CP}$ equalized using the channel characteristics $H_{CP}$ obtained through channel estimation by interpolation of the SP signals, and uses its error amount as the noise power of the CP signals representing the noise amount of the OFDM symbol. Since the noise amount is calculated from some signals (CP signals), to improve the estimation accuracy with respect to thermal noise component, average noise power among symbols $N_{Acc}$ accumulated over some symbols is used.

In the case where the time axis processor 103 performs processing of converting A/D conversion sampling rate into OFDM signal sampling rate (rate conversion), in consideration of rate conversion of the received signal, the interference wave power estimation unit 104 may also process sample timing of the interference wave detection signal. Further, based on a signal after rate conversion, the interference detection and processing of the interference detection sample by the interference wave detector 102 (processing of converting into 0) may be performed. In this case, an interference detection signal need not allow for the effect of rate conversion.

Although the mask processor 112 replaces the received signal with 0 on the basis of the signal detected by the interference wave sample detector 111 in this embodiment, batch processing may be performed such that the sample exceeding the threshold is replaced with 0 to output a detection signal.

The reliability information converter 143 may convert the reliability information by using information other than the noise power and the signal power. For example, by using a frequency-varying component that occurs with the Doppler frequency, the reliability information corresponding to frequency variance can be estimated.

The number of samples included in the OFDM symbol, which is calculated by the interference wave sample counter 131, represents the noise amount locally increased by eliminating the OFDM signal in the symbol. For this reason, the number of interference wave samples may be used as a signal representing that the interference wave exists in various blocks. For example, in the calculation of the average noise amount among symbols in the noise estimation unit 141, the noise amount of the symbol exceeding the predetermined number of interference wave samples may be eliminated in averaging processing.

Although one aspect of the present invention is applied to the error correction method or demodulation method using the LDPC in this embodiment, it can be applied to other error correction methods or demodulation methods.

As described above, the receiver in accordance with one aspect of the present invention can calculate the interference wave power in the OFDM symbol on the basis of the number of samples having the received power exceeding the predetermined threshold in the OFDM symbol, thereby estimating the interference wave power in units of OFDM symbol without depending on the type of the signal transmitted in the OFDM symbol. As a result, in the demodulation processing, the interference wave power calculated based on the number of samples having the received power exceeding the predetermined threshold can be used as the interference wave power of the OFDM symbol including no CP signal. Thus, even when impulse interference or signal elimination exists in the OFDM symbol including no CP signal, stable reception can be achieved.

That is, conventionally, as in the noise power detection method using the CP signals included in the OFDM symbol, the interference wave power of the OFDM symbol including particular signals can be estimated by using the particular signals. On the contrary, according to the present invention, the interference wave power can be estimated in the units of OFDM symbol without depending on the type of signal transmitted in the OFDM symbol.

In the demodulation processing, for example, whether or not noise in the symbol can be estimated according to the noise power detection method using the CP signals, the noise power taking into account the estimated interference power can be estimated to generate the reliability information. Therefore, even when impulse interference or signal elimination exists, error correction can be performed based on the high-accuracy reliability information, thereby enabling stable reception.

The LDPC (Low Density Parity Check) demodulation processing can be performed on the basis of the high-accuracy reliability information. LDPC demodulation processing enables demodulation processing taking into account the inputted reliability information, and realizes demodulation processing with higher accuracy by inputting the high-accuracy reliability information.

Impulse interference or signal elimination that exists during the actually Fourier-transformed symbol period can be estimated.

By setting the sample having the interference wave to 0, residues of interference power can be reduced, thereby enabling stable reception.

By calculating the interference power on the basis of the number of samples exceeding the predetermined threshold during the OFDM symbol period, the interference power can be calculated whether or not noise in the symbol can be estimated. Then, effective channel estimation can be achieved based on the calculated interference power, thereby enabling stable reception.

Based on the number of samples exceeding the predetermined threshold during the OFDM symbol period and a coefficient related to a predetermined constant, the interference power can be calculated with high accuracy, and effective demodulation can be achieved on the basis of the calculated interference power, thereby enabling stable reception.

Second Embodiment

A receiver in accordance with Second embodiment of the present invention will be described below with reference to FIG. 7 to FIG. 10. The same components as those in FIG. 1 to FIG. 6 are given the same reference numerals and description thereof is omitted.

Figure 7:
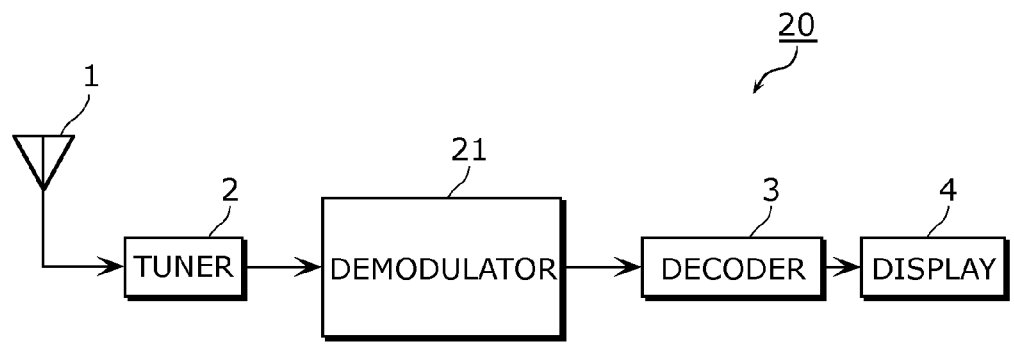
FIG. 7 A block diagram showing a configuration of a receiver in accordance with Second embodiment.
Figure 8:
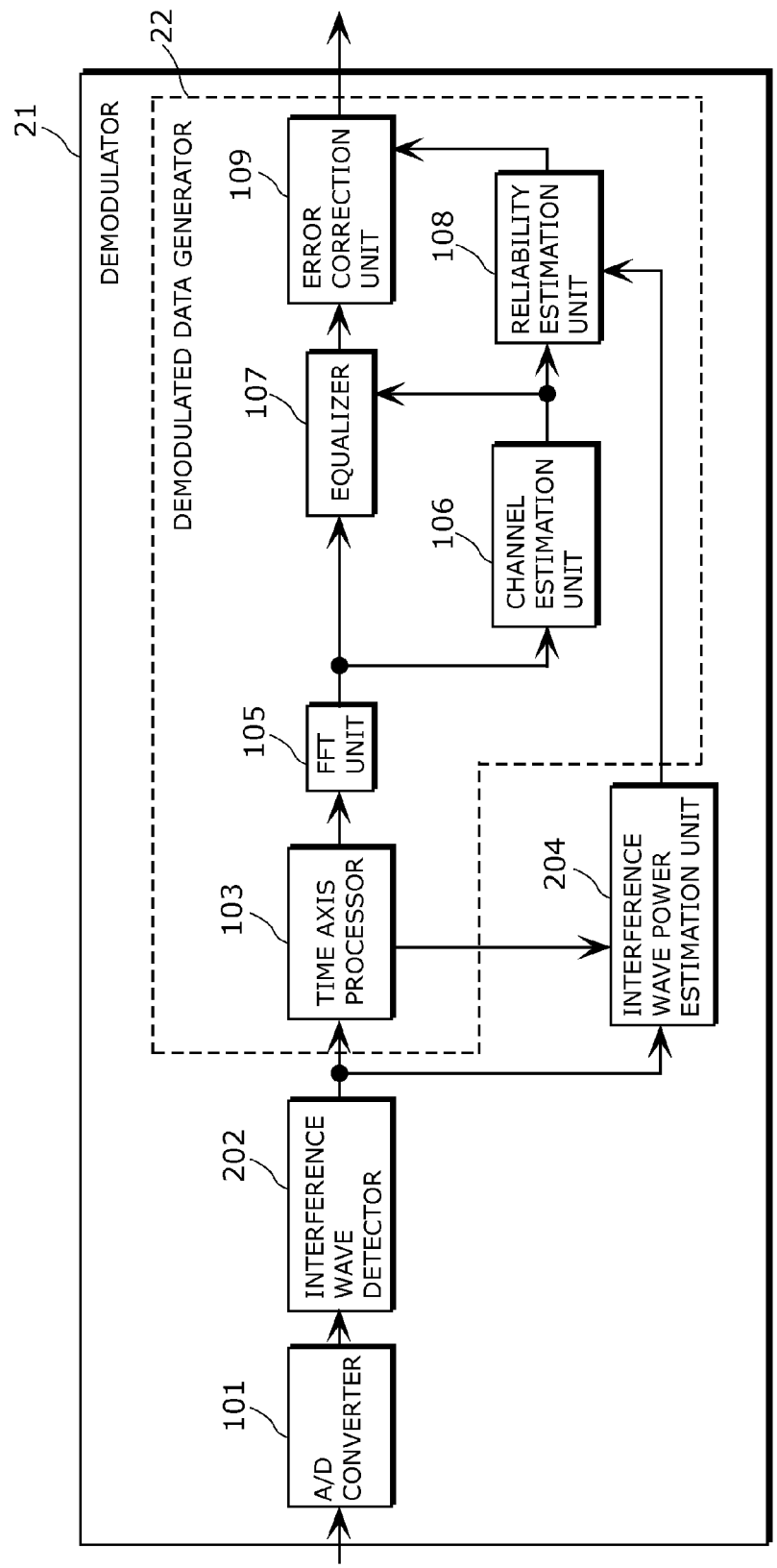
FIG. 8 A block diagram showing a configuration of a demodulator 21 in accordance with Second embodiment.

FIG. 7 is a block diagram showing a receiver 20 in accordance with Second embodiment of the present invention, and FIG. 8 is a block diagram showing a configuration of a demodulator 21. FIG. 8 is different from FIG. 2 only in an interference wave detector 202 and an interference wave power estimation unit 204.

Figure 9:
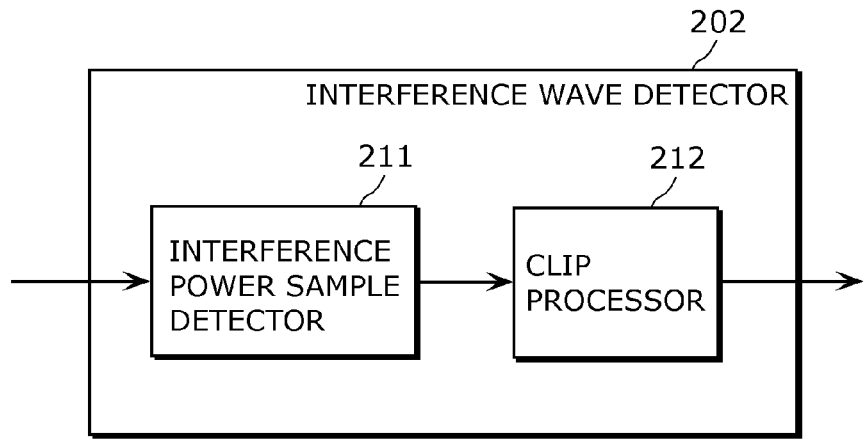
FIG. 9 A block diagram showing a configuration of an interference wave detector 202 in accordance with Second embodiment.

FIG. 9 is a view showing a configuration of the interference wave detector 202. The interference wave detector 202 includes an interference wave sample detector 211 and a clip processor 212.

Like the interference wave sample detector 111 in First embodiment, the interference wave sample detector 211 compares a received signal converted into a digital signal by an A/D converter with a predetermined threshold, and outputs an interference wave detection signal together with the received signal.

In the sample of Interference Exist=1 (interference wave exists) as a detection result of the interference wave, the clip processor 212 replaces the received signal with a predetermined value. The predetermined value may be the same as the threshold in the interference wave sample detector 211. When the received signal exceeds the negative threshold, the predetermined value may be same as the negative threshold in this processing.

Figure 10:
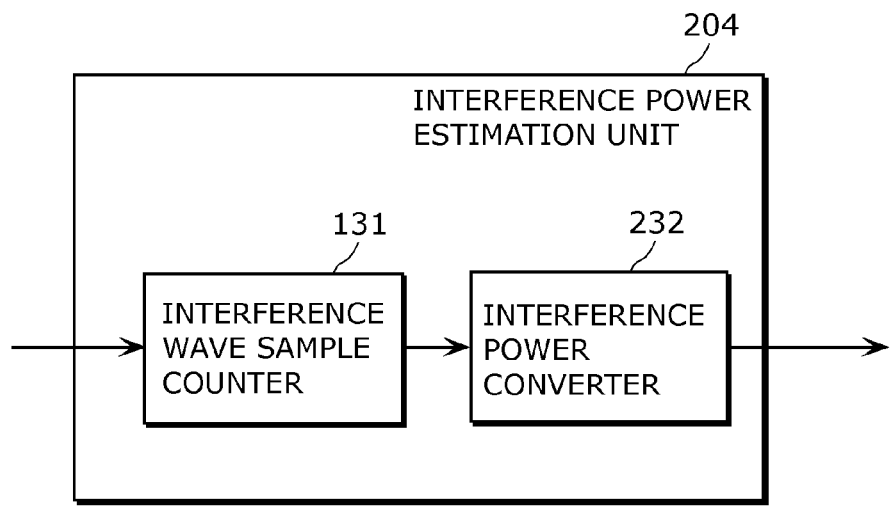
FIG. 10 A block diagram showing a configuration of an interference wave power estimation unit 204 in accordance with Second embodiment.

The interference wave detector 202 outputs the interference wave detection signal to the interference wave power estimation unit 204. FIG. 10 is a block diagram showing a configuration of the interference wave power estimation unit 204. The interference wave power estimation unit 204 includes an interference wave sample counter 131 and an interference power converter 232.

As in First embodiment, the interference wave sample counter 131 counts the number of samples determined as "interference wave exists", which are included in the OFDM symbol, and outputs the count to the interference power converter 232.

Based on the number of samples determined as "interference wave exists", which is calculated by the interference wave sample counter 131, the interference power converter 232 calculates the interference wave power included in the OFDM signal. In this embodiment, since the interference wave is converted into the predetermined value (clip processing), it can be deemed that the interference wave corresponding to the predetermined value for the number of interference wave samples exists in the OFDM symbol. Given that the OFDM signal power is $P_{OFDM}$ and the square of the interference wave clipped value is $A_{Clip} \times P_{OFDM}$, the signal level of each sample of the OFDM signal becomes $P_{OFDM}/N_{FFT}$, while the signal level of the clipped interference wave power becomes $A_{Clip} \times P_{OFDM}/N_{FFT}$. Consequently, interference wave power $I_{Clip}$ at clipping of the interference wave can be expressed by (Equation 2).

$$I_{Clip} = N_I \times A_{Clip} \times P_{OFDM}/N_{FFT} \quad \text{(Equation 2)}$$

As in First embodiment, the interference power adder 142 of the reliability estimation unit 108 takes into account the interference wave component included in the symbol to increase the accuracy of the reliability information to be used for LDPC decoding in the reliability estimation unit, thereby enabling stable reception.

When the time axis processor 103 performs processing of converting A/D conversion sampling rate into OFDM signal sampling rate (rate conversion), in consideration of the rate conversion of the received signal, the interference wave power estimation unit 104 may also process sample timing of the interference wave detection signal. Further, based on a signal after rate conversion, the interference detection and processing of the interference detection sample by the interference wave detector 202 (processing of converting into the predetermined value) may be performed. In this case, an interference detection signal need not allow for the effect of rate conversion.

Although the clip processor 212 performs conversion into the predetermined value on the basis of the signal detected by the interference wave sample detector 211, batch processing may be performed such that the sample exceeding the threshold is replaced with the predetermined value to output a detection signal.

Since the interference power in the sample determined as "interference wave exists" in Equation 2 includes the OFDM signal itself to be exact, the OFDM signal component may be subtracted.

As described above, in the receiver according to one aspect of the present invention, by replacing the sample having the interference wave with the predetermined value, residues of the interference power can be reduced, thereby enabling stable reception.

Third Embodiment

A receiver in accordance with Third embodiment of the present invention will be described below with reference to FIG. 11 to FIG. 14A. The same components as those in FIG. 1 to FIG. 6 are given the same reference numerals and description thereof is omitted.

Figure 11:
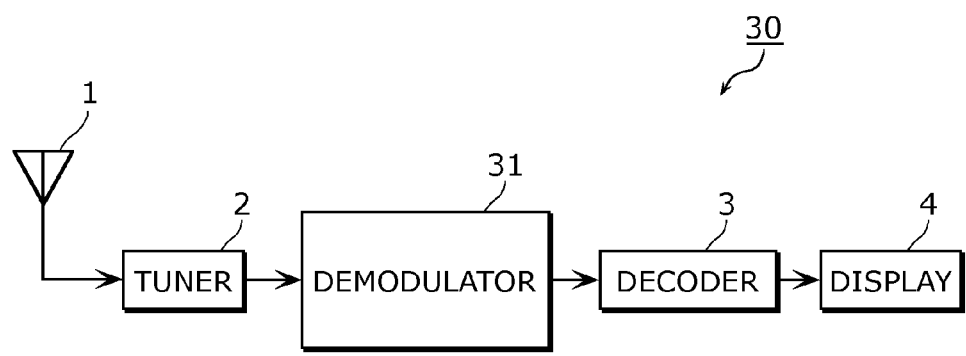
FIG. 11 A block diagram showing a configuration of a receiver in accordance with Third embodiment.
Figure 12:
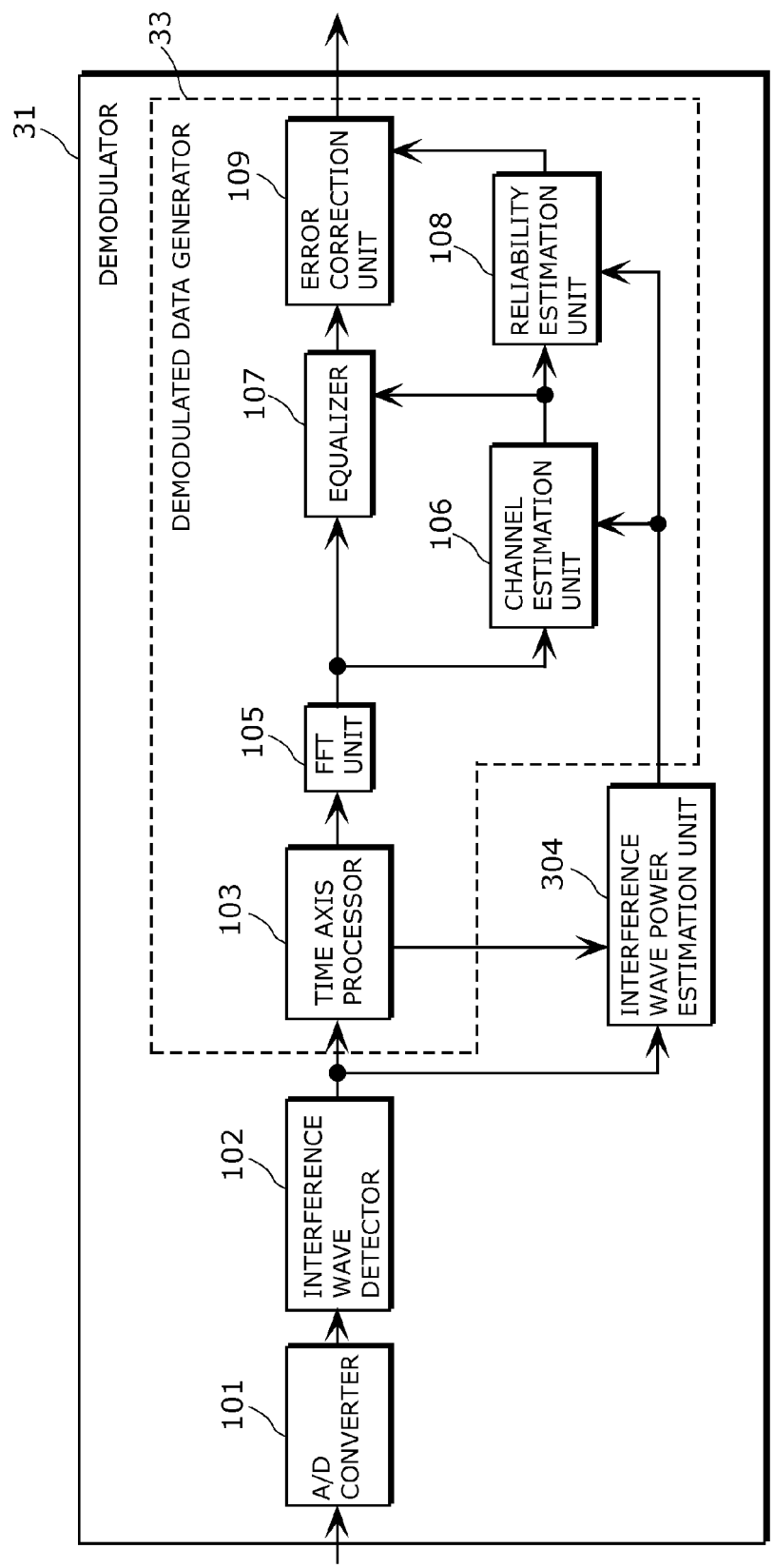
FIG. 12 A block diagram showing a configuration of a demodulator 31 in accordance with Third embodiment.

FIG. 11 is a block diagram showing a receiver 30 in accordance with Third embodiment of the present invention, and FIG. 12 is a block diagram showing a configuration of a demodulator 31. The demodulator 31 shown in FIG. 12 is different from the demodulator 11 in First embodiment in a configuration of an interference wave power estimation unit 304.

Figure 13:
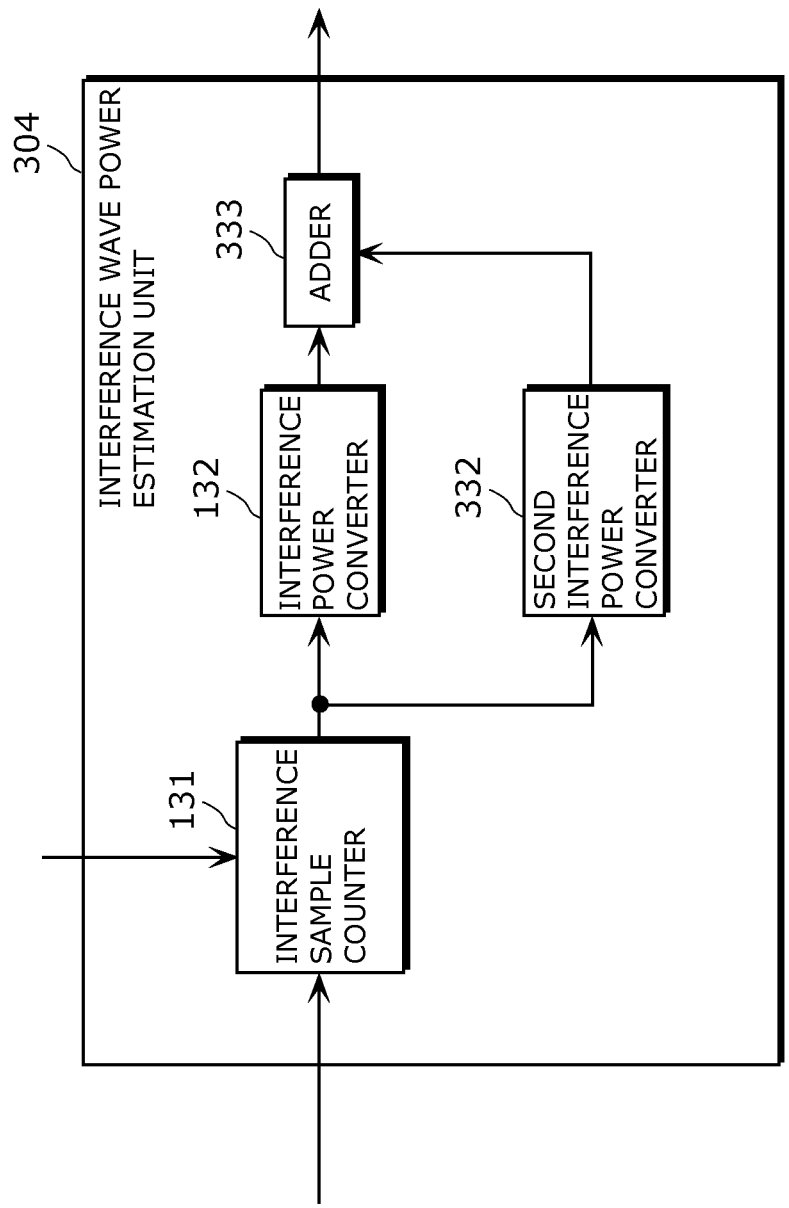
FIG. 13 A block diagram showing a configuration of an interference wave power estimation unit 304 in accordance with Third embodiment.

FIG. 13 is a view showing the configuration of the interference wave power estimation unit 304. The interference wave power estimation unit 304 includes an interference wave sample counter 131, an interference power converter 132, a second interference power converter 332, and an adder 333. The interference wave power estimation unit 304 corresponds to a second interference wave power estimation unit.

As in First embodiment, the interference wave sample counter 131 counts the number of samples determined as "interference wave exists" in the OFDM symbol on the basis of the interference wave detection signal detected by the interference wave detector 102 and the OFDM symbol position detected by the FFT window position detector 122, at which the FFT is performed, and outputs the count to the interference power converter 132 and the second interference power converter 332.

As in First embodiment, the interference power converter 132 calculates the interference power included in the received OFDM symbol from the output of the interference wave sample counter 131. This embodiment is different from First embodiment in the second interference power converter 332.

The second interference power converter 332 calculates the interference power occurring in the current OFDM symbol from the interference wave including other OFDM symbols. Here, considering that, through interpolation processing in channel estimation, the effect of the interference wave is spread to the other OFDM symbols corrected by the equalizer 107, the interference wave power is estimated by the channel estimation.

The adder 333 adds the interference power of the current OFDM symbol estimated by the interference power converter 132 and the interference power of the other OFDM symbols estimated by the second interference power converter 332 and outputs the sum.

Estimation of the channel characteristics is to obtain the channel characteristicss of all subcarriers by interpolating the channel characteristicss of the SP signals, the P2 pilot signals, and the FC signals that exist in a distributed manner in the time axis (symbol) direction and the frequency axis (carrier) direction. Interpolation methods include (A) a method of interpolating the signals in the time axis (symbol) direction and then, interpolating the signals in the frequency axis (carrier) direction, and (B) a method of interpolating the signals only in the frequency axis (carrier) direction.

Figure 14A:
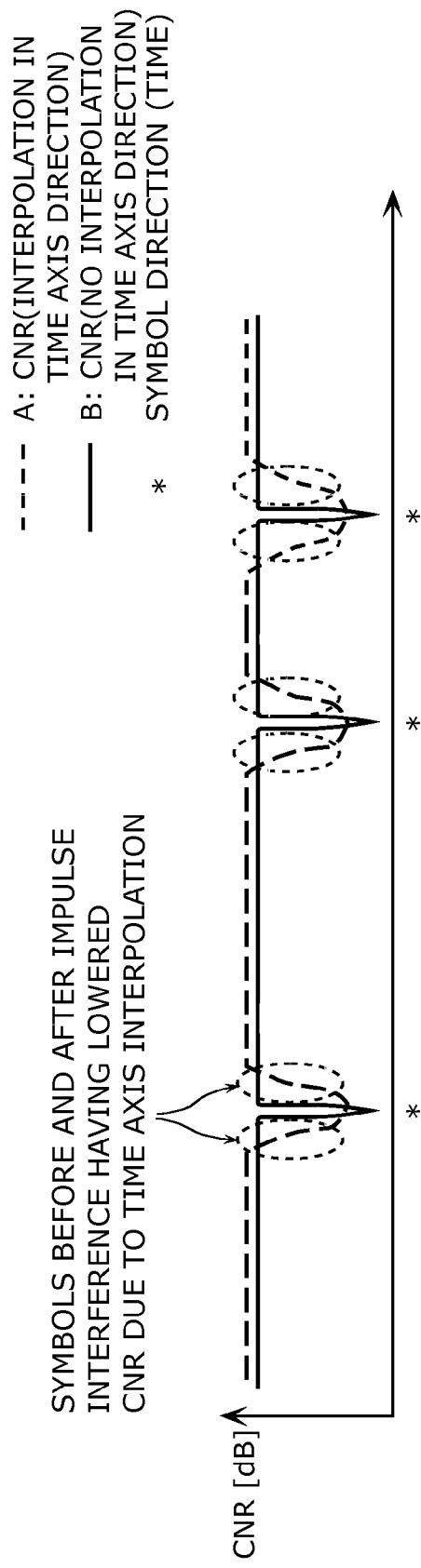
FIG. 14A A schematic view showing a transition of CNR in interpolation processing in channel estimation.
Figure 14B:
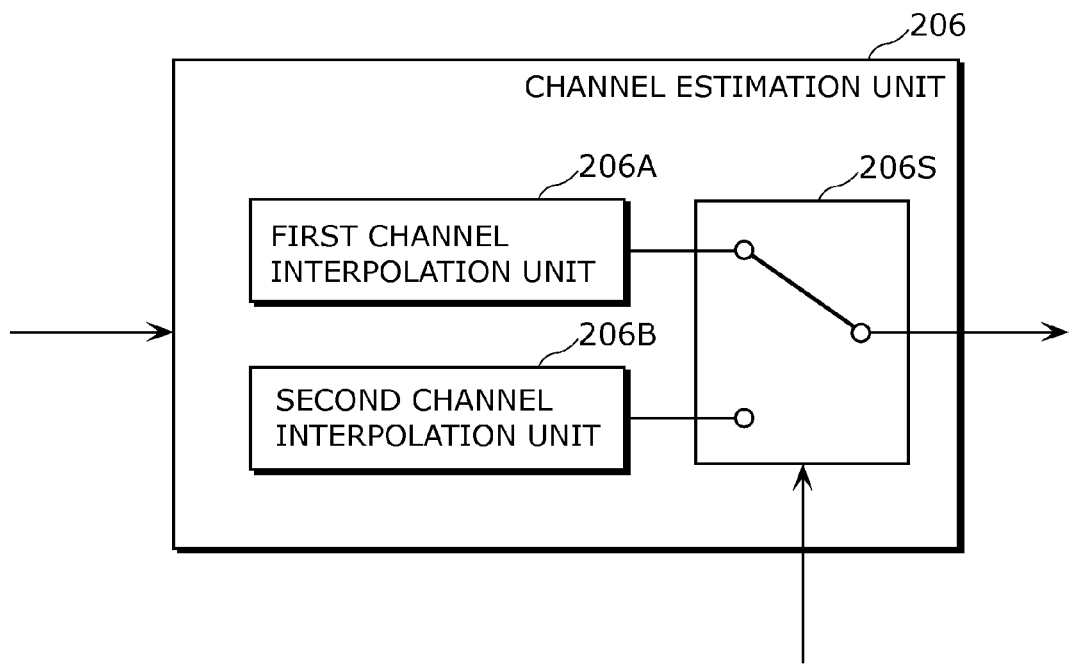
FIG. 14B A block diagram showing an example of a configuration of a channel estimation unit 106.

FIG. 14A shows a transition of CNR (Carrier to Noise ratio) of each OFDM symbol corrected by the equalizer 107 in each of cases where as the interpolation processing in the channel estimation in an impulse interference environment, (A) time axis interpolation and frequency interpolation are used, and (B) only the frequency axis interpolation is used (no time axis interpolation). A horizontal axis represents the symbol direction (time direction), and a vertical axis represents the CNR. When the impulse interference occurs at timings expressed by asterisk (*), (B) in the case where only the frequency axis interpolation is used, the CNR lowers only in the symbols having the impulse interference, and (A) in the case where the time axis interpolation is also used, since the symbol having the impulse interference is used in the interpolation processing, an interpolation error occurs due to the interference wave and therefore, the CNR lowers also in the symbols before and after the symbol having the impulse interference.

In consideration of this, in this embodiment, the second interference power converter 332 takes into account of the effect of the interference wave in the channel estimation, and in the case of (B) only the frequency axis interpolation, the effect of the current symbol on the channel characteristics is regarded as the interference power. In the case of (A) time axis interpolation+frequency interpolation, the effect of the symbol having interference and the symbols before and after the current symbol is also regarded as the interference power. Here, the number of interference wave samples, which is outputted from the interference wave sample counter 131, is subjected to the same processing as time interpolation, the number of interference samples that takes into account the effect of the interference wave by time axis interpolation is estimated, and the interference power including the interpolation error is calculated.

As described above, the effect of the interference wave on the channel estimation changes depending on the patterns (A) time axis interpolation+frequency axis interpolation, and (B) only frequency axis interpolation. Details of each pattern will be described below.

((A) Time Axis Interpolation+Frequency Axis Interpolation)

The DVB-T2 scheme has eight types of SP patterns. For simplifying description, linear interpolation in the time axis direction is used as an example. An SP carrier interval in the time axis direction is classified into two types: (1) every two carriers and (2) every four carriers. Thus, the range in which the effect of the interference wave in the time interpolation is spread is one symbol in the case (1) and three symbols in the case (2) before and after the symbol having the detected interference wave. As a result, the number of interference wave samples for estimating the channel estimation error in the i symbol due to the interference wave: (1) $N_{H\_TF2sym}$ and (2) $N_{H\_TF4sym}$ are as follows.

$$N_{H\_TF2sym}(i) = 1/2 \times \{N_I(i) + (1/2)^2 \times (N_I(i-1) + N_I(i+1))\} \quad \text{(Equation 3)}$$

$$\begin{aligned}N_{H\_TF4sym}(i) = & \quad \text{(Equation 4)}\\ & 1/4 \times \{N_I(i) + (3/4)^2 \times (N_I(i-1) + N_I(i+1)) + \\ & (2/4)^2 \times (N_I(i-2) + N_I(i+2)) + \\ & (1/4)^2 \times (N_I(i-3) + N_I(i+3))\}\end{aligned}$$

((B) Frequency Axis Interpolation)

In the case of only the frequency axis interpolation; since the effect is not spread to symbols before and after the rear of the symbol having the interference wave, the number of interference wave samples in the i symbol in the channel estimation: $N_{H\_F}(i)$ is as follows.

$$N_{H\_F}(i) = N_I(i) \quad \text{(Equation 5)}$$

To calculate the interference power taking into account the channel estimation error on the basis of the number of interference wave samples according to each of the above-mentioned interpolation methods, it is required to correct the noise amount related to SP signal power and interpolation filter band. The interference power taking into account the channel estimation error in the cases (A) and (B) is as represented by (Equation 6) and (Equation 7), respectively. It is assumed that $A_{SP}$ is boost of the SP signal, BWT is band of the time interpolation filter, and BWF is band of the frequency interpolation filter.

(A)

$$I_{H\_TF} = (1/A_{SP}) \times N_{H\_TF}/N_{FFT} \times BWT \times BWF \quad \text{(Equation 6)}$$

(B)

$$I_{H\_F} = (1/Asp) \times N_{H\_F}/N_{FFT} \times BWF \quad \text{(Equation 7)}$$

The adder 333 adds the interference power estimated by the interference wave power estimation unit to the interference power taking into account the channel estimation error corresponding to respective interpolation method, thereby reflecting the interference power included in the OFDM symbol as well as the interference power including the effect of the interference wave in the channel estimation. Since the interference power can be appropriately reflected on the reliability information in the interference power adder 142 of the reliability estimation unit 108, high-accuracy reliability information can be obtained, resulting in effective LDPC decoding and improvement of the reception performance.

Although the adder 333 adds the interference power from the interference power converter 132 to the interference power from the second interference power converter 332 in this embodiment, the adder 333 may use the interference power from either of the converters.

Although the linear interpolation is adopted as the time axis interpolation, the linear interpolation is not limited to this, and any interpolation method (interpolation coefficient) may be adopted.

Alternatively, as shown in FIG. 14A, considering that the effect of the interference power varies according to the interpolation method, and the signal quality varies in the first place, the interpolation method may be selected based on the calculated interference power. Specifically, a channel estimation unit 206 shown in FIG. 14B may be used. The channel estimation unit 206 includes a first channel interpolation unit 206A, a second channel interpolation unit 206B, and a selector 206S. The first channel interpolation unit 206A and the second channel interpolation unit 206B estimate different channel characteristicss. The selector 206S selects either an output from the first channel interpolation unit 206A or an output from the second channel interpolation unit 206B, as the channel characteristics. In this manner, the reliability information in the demodulation processing can be selected from a plurality of channel characteristicss. Since one of the outputs from the plurality of channel interpolation units is selected, the interference wave power estimation unit can estimate the interference power corresponding to each interpolation processing.

Although the sample having interference is masked to 0 in this embodiment unlike First embodiment, as in Second embodiment, the sample having interference may be replaced with the predetermined value may be taken into account in (Equation 3) to (Equation 5).

As described above, the receiver in accordance with one aspect of the present invention can calculate the interference wave power according to the appropriate interference wave power estimation method selected the plurality of interference wave power estimation methods for each symbol to use the interference wave poser in the demodulation processing, and achieve effective decoding by using the interference wave power, thereby enabling stable reception.

By calculating the interference power on the basis of the number of samples exceeding the predetermined threshold during the OFDM symbol period, the interference power of the symbols that cannot be subjected to the processing using the CP signals can be calculated. The demodulation processing can be performed using the calculated interference power to achieve effective demodulation, thereby enabling stable reception.

By calculating the interference power on the basis of the number of samples exceeding the predetermined threshold during the OFDM symbol period, the interference power of the P2 symbol and the FC symbol that cannot be subjected to the processing using the CP signals can be calculated. The demodulation processing can be performed using the calculated interference power to achieve effective demodulation, thereby enabling stable reception.

By calculating the interference power on the basis of the number of samples exceeding the predetermined threshold during the OFDM symbol period, the interference power can be calculated whether or not noise in the symbol can be estimated, and the interpolation method for effective channel estimation can be selected based on the interference power, thereby enabling stable reception.

Fourth Embodiment

A receiver in accordance with Fourth embodiment of the present invention will be described below. The same components as those in FIG. 1 to FIG. 6 are given the same reference numerals and description thereof is omitted.

Figure 15:
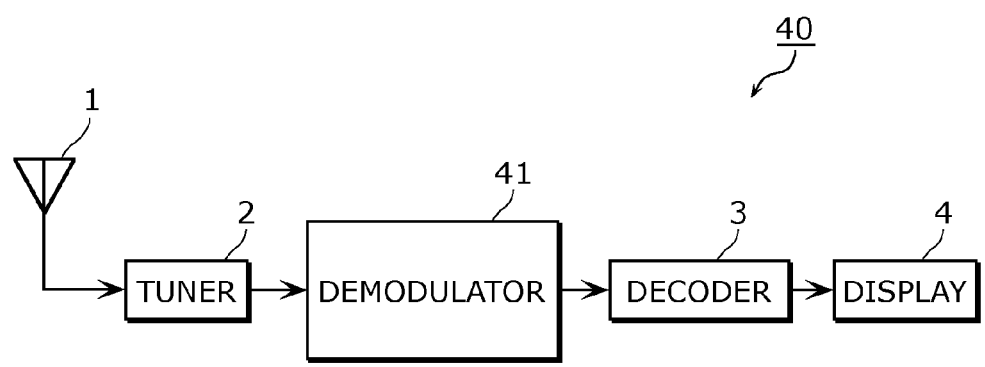
FIG. 15 A block diagram showing a configuration of a receiver in accordance with Fourth embodiment.
Figure 16:
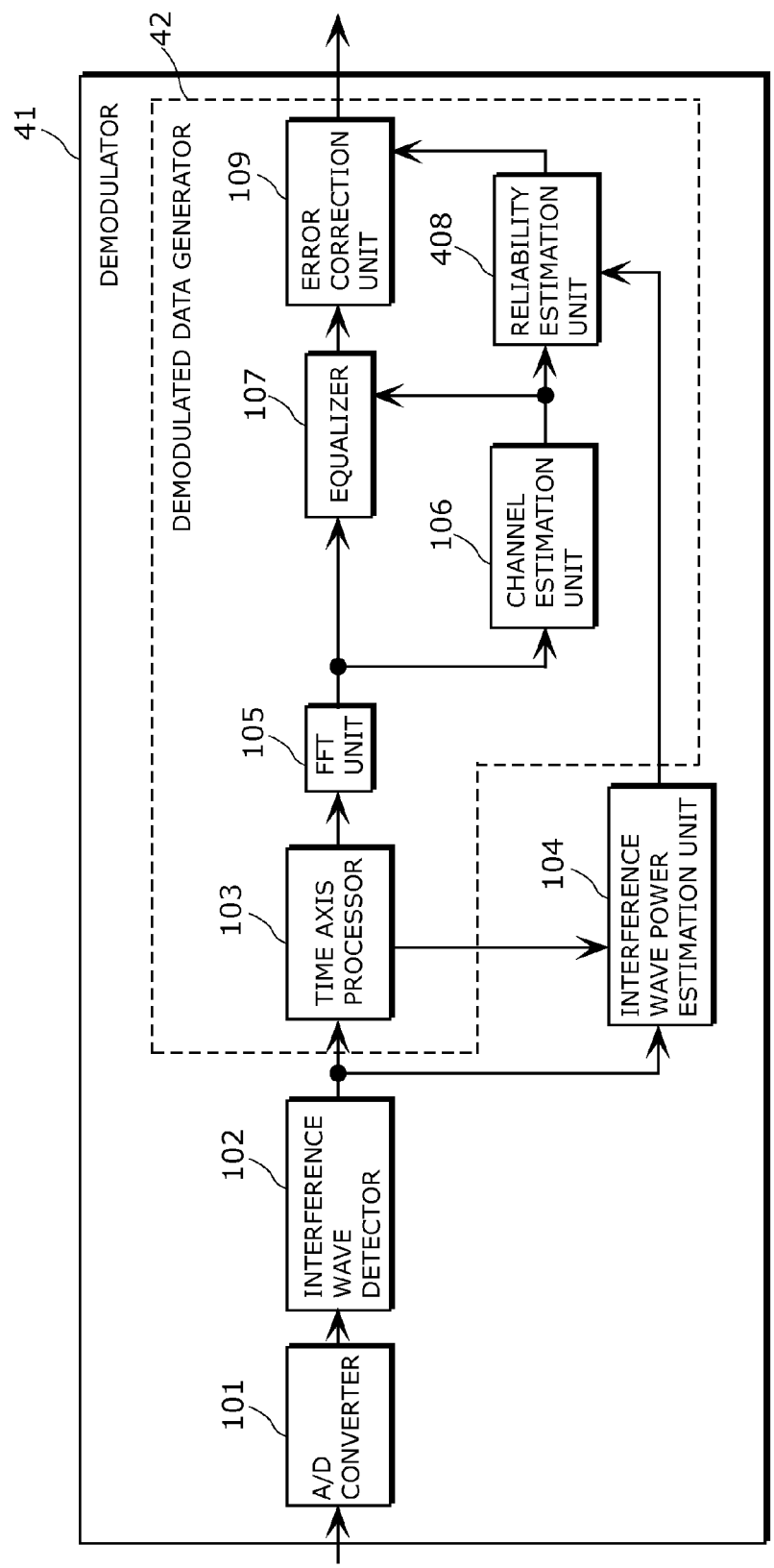
FIG. 16 A block diagram showing a configuration of a demodulator 41 in accordance with Fourth embodiment.

FIG. 15 is a block diagram showing a receiver 40 in accordance with Fourth embodiment of the present invention, and FIG. 16 is a block diagram showing a configuration of a demodulator 41. The demodulator 41 is different from the demodulator 11 in First embodiment in addition of the interference power in a reliability estimation unit 408.

Figure 17:
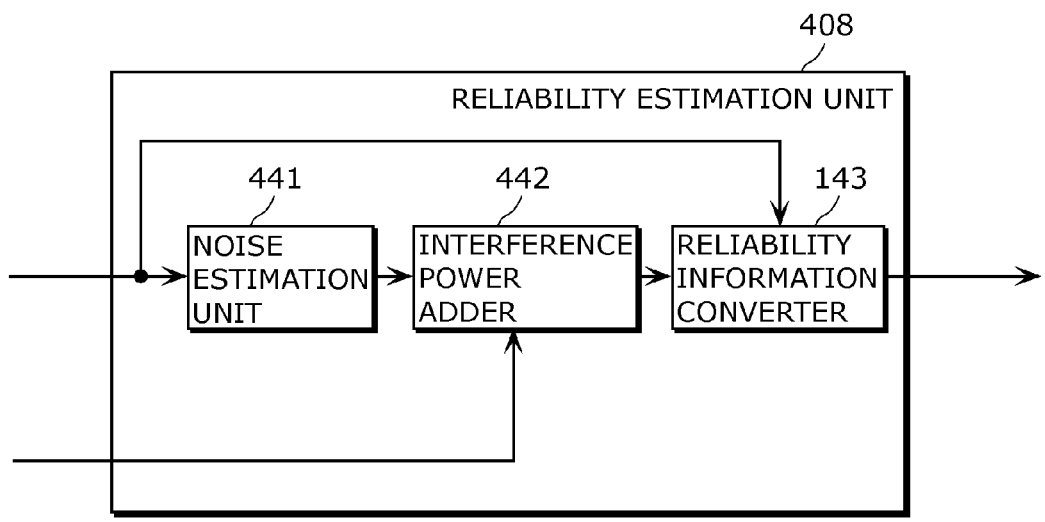
FIG. 17 A block diagram showing a configuration of a reliability estimation unit 408 in accordance with Fourth embodiment.

FIG. 17 is a block diagram showing a configuration of the reliability estimation unit 408. The reliability estimation unit 408 includes a noise estimation unit 441, an interference power adder 442, and a reliability information converter 143. The noise estimation unit 441 outputs an average symbol noise estimated value averaged in the symbol direction together with non-average noise estimated value for each symbol to the interference power adder 442.

The interference power adder 442 is different from the interference power adder 142 in First embodiment in that whether or not the interference power estimated by the interference wave power estimation unit 104 is added is selected according to the symbol to be processed. Here, using transmission parameter information obtained by decoding the P2 symbol or the symbol number of the received signal using the P1 signal as a reference, according to the type of the current symbol (P1 symbol, P2 symbol, data symbol, or FC symbol), the average symbol noise estimated value with the addition to the interference power is outputted in the case of a particular symbol, and the non-average noise estimated value for each symbol in the symbol direction without the addition to the interference power is outputted in the case of the symbols other than the particular symbol. A specific example in the DVB-T2 scheme will be described below.

Since the P2 symbol and the FC symbol do not include the CP signal according to the DVB-T2 scheme, in these symbols, noise power cannot be estimated by using the CP signal. On the contrary, in the other symbols, noise power can be estimated by using the CP signal for each symbol. Thus, in the P2 symbol or the FC symbol, in which noise power cannot be estimated by using the CP signal for each symbol, the noise estimated value averaged in the symbol direction with the addition to the interference power is outputted. In the other symbols, the non-average noise estimated value for each symbol without the addition of the symbol direction is outputted.

As described above, by using the noise estimated value calculated for each symbol in the symbols that can estimate noise for each symbol, and adding the interference power to the average noise estimated value in the symbols that cannot estimate noise, the noise amount can be correctly reflected on the reliability information. For this reason, high-accuracy reliability information can be obtained, resulting in effective LDPC decoding and improvement of the reception performance.

In the symbols other than particular symbols such as the P2 symbol and the FC symbol, the non-average noise estimated value for each symbol in the symbol direction is used. However, the present invention is not limited to this, and the noise estimated value averaged in the symbol direction or the non-average noise estimated value for each symbol may be selected. For example, these values are compared to each other, and when the noise estimated value for each symbol is larger, the noise estimated value for each symbol may be used, and when the noise estimated value for each symbol is not larger, the average noise estimated value may be used. Alternatively, when the number of interference samples estimated by the interference wave power estimation unit 104 is larger than a predetermined number, the noise estimated value for each symbol may be used, and when the number of interference samples is not larger than a predetermined number, the average noise estimated value may be used.

Although the configuration in which the necessity of addition of the interference power is selected according to the type of symbols is applied to First embodiment, the configuration may be applied to Second embodiment and Third embodiment.

As described above, the receiver in accordance with one aspect of the present invention can calculate the interference power on the basis of the number of samples exceeding the predetermined threshold during the OFDM symbol period, to calculate the interference power whether or not noise can be estimated in the symbol, and can perform effective channel estimation of the other OFDM symbols on the basis of the calculated interference power, thereby enabling stable reception.

In the calculation of the interference power by the OFDM receiver in First to Fourth embodiments, the reliability of the reliability information of the current symbol may be decreased by a predetermined value from that of the other symbols according to the presence/absence of the interference wave power without estimating details of the interference wave power in (Equation 1) to (Equation 3).

For example, when the number of interference wave samples included in the OFDM symbol is equal to or larger than the predetermined threshold, the reliability estimated value may be reduced to half. In this case, it is not need to calculate detailed interference power, achieving reduction of circuit size.

Each component of the OFDM receivers in accordance with First to Fourth embodiments may be formed of an LSI as an integrated circuit. Here, the components may be individually shaped into one chip, or may be partially or wholly integrated into one chip. Although the LSI is mentioned herein, IC, system LSI, super LSI, or ultra LSI may be called according to integration degree. The integrated circuit is not limited to the LSI, may be realized by a dedicated circuit or a general processor. FPGA (Field Programmable Gate Array) or a reconfigurable processor capable of reconfiguring connection and setting of circuit cells in the LSI can be used. Further, if any technology for integrated circuit in place of the LSI appears with the progress of the semiconductor technology or other derived technology, as a matter of course, the functional blocks may be integrated by use of the new technology. Biotechnology is one of possible technologies.

At least a part of the operational procedure of the receivers in First to Fourth embodiments may be written into an integrated program, and for example, a CPU (Central Processing Unit) may read and execute the program stored in a memory, or the program may be stored in a storage medium and then, distributed.

The receivers in First to Fourth embodiments may be realized according to a receiving method that executes at least a part of the written reception processing.

Any receiver, receiving method, integrated circuit, or program that executes a part of the reception processing realizing First to Fourth embodiments may be combined to realize First to Fourth embodiments. For example, a part of the configuration of the receiver, which is described in each of the above-mentioned embodiments, may be realized by the receiver or the integrated circuit, the operational procedure executed by remaining parts of the configuration may be written into the reception program, and for example, the CPU may read and execute the program stored in the memory.

Although the DVB-T2 scheme is described in First to Fourth embodiments, the present invention is not limited to this. Like the DVB-T2, the present invention can be also applied to the field of OFDM communication that desires improvement of the accuracy of estimating the noise power according to change in the channel due to the interference wave.

In each of the above-mentioned embodiments, each component may be configured of dedicated hardware, or realized by executing a software program suitable for each component. Alternatively, a program execution unit such as a CPU or a processor may read and execute a software program stored in a storage medium such as a hard disc or a semiconductor memory to realize each component. A following program is an example of software that realizes an image decoder in each of the above-mentioned embodiments.

That is, the program causes a computer to perform a receiving method including demodulating modulation wave modulated according to orthogonal frequency division multiplexing (OFDM), and the demodulation step includes an interference wave detection step of detecting that received modulation wave as the modulation wave received according to the receiving method includes interference wave when received power of each sample of the received modulation wave exceeds a threshold, and upon the detection, executing replacement processing of replacing received signal exceeding the threshold with a predetermined value, a first interference wave power estimation step of estimating interference wave power included in an OFDM symbol included in the received modulation wave on the basis of the number of samples that have been subjected to the replacement processing, and a demodulation data generation step of demodulating the received modulation wave by executing demodulation processing of demodulating the received modulation wave that has been subjected to the replacement processing in the detecting on the basis of the interference wave power estimated in the estimating, to generate demodulation data.

Although the method of mounting the components according to the present invention has been described based on the embodiment, the present invention is not limited to the embodiment. Embodiments obtained by adding various modifications devised by those skilled in the art to this embodiment or combining components in different embodiments also fall within the scope of the present invention as long as they are not deviated from the subject matter of the present invention.

INDUSTRIAL APPLICABILITY

The receiver according to the present invention has functions of detecting the presence/absence of the interference wave for each sample in the time axis region, estimating the interference power on the basis of the number of samples having the interference wave during the FFT sample period of the OFDM symbol, and estimating the reliability information used for the LDPC decoding in consideration of the interference power, and is effective for the OFDM receiver such as DVB-T2 requiring high-accuracy reliability information as well as devices in wider fields such as measurement.

| [Reference Signs List] | |
|---|---|
| 1: | antenna |
| 2: | tuner |
| 3: | decoder |
| 4: | display |
| 10, 20, 30, 40: | receiver |
| 11, 21, 31, 41: | demodulator |
| 12, 22, 32, 42: | demodulated data generator |
| 101: | A/D converter |
| 102: | interference wave detector |
| 103: | time axis processor |
| 104: | interference wave power estimation unit |
| 105: | FFT unit |
| 106: | channel estimation unit |
| 107: | equalizer |
| 108: | reliability estimation unit |
| 109: | error correction unit |
| 111: | interference wave sample detector |
| 112: | mask processor |
| 121: | synchronizer |
| 122: | FFT window position detector |
| 131: | interference wave sample counter |
| 132: | interference power converter |
| 141: | noise estimation unit |
| 142: | interference power adder |
| 143: | reliability information converter |
| 202: | interference wave detector |
| 204: | interference wave power estimation unit |
| 211: | interference wave sample detector |
| 212: | clip processor |
| 232: | interference power converter |
| 304: | interference wave power estimation unit |
| 332: | second interference power converter |
| 333: | adder |
| 408: | reliability estimation unit |
| 441: | noise estimation unit |
| 442: | interference power adder |
| 1002: | A/D converter |
| 1003: | time axis processor |
| 1004: | FFT unit |
| 1005: | channel estimation unit |
| 1006: | equalizer |
| 1007: | error correction unit |
| 1008: | reliability estimation unit |

The invention claimed is:

1. A receiver comprising:
a demodulator that demodulates a modulation wave modulated according to orthogonal frequency division multiplexing (OFDM), the demodulator including:
an interference wave detector that detects that a received modulation wave which is received by the receiver includes an interference wave when received power of each sample of the received modulation wave exceeds a threshold, and upon the detection, executes replacement processing of replacing a received signal exceeding the threshold with a predetermined value;
a first interference wave power estimation unit configured to estimate interference wave power included in an OFDM symbol included in the received modulation wave on the basis of the number of samples that have been subjected to the replacement processing in the OFDM symbol; and
a demodulated data generator that demodulates the received modulation wave by executing demodulation processing of demodulating the received modulation wave that has been subjected to the replacement processing by the interference wave detector on the basis of the interference wave power estimated by the first interference wave power estimation unit, to generate demodulation data.

2. The receiver according to claim 1,
wherein the demodulated data generator includes:
a reliability estimation unit configured to estimate reliability information with respect to the received modulation wave to obtain a lower reliability of the OFDM symbol as the interference wave power estimated by the first interference wave power estimation unit is larger; and
an error correction unit configured to execute error correction processing of correcting an error included in the received modulation wave on the basis of the reliability information estimated by the reliability estimation unit, as the demodulation processing for the received modulation wave, to generate the demodulation data for the received modulation wave.

3. The receiver according to claim 2,
wherein the error correction unit is configured to execute weighting processing of a log likelihood ratio in LDPC (Low Density Parity Check) demodulation on the basis of the reliability information estimated by the reliability estimation unit, as the demodulation processing for the received modulation wave, to generate demodulation data for the received modulation wave.

4. The receiver according to claim 1,
wherein the demodulated data generator includes:
an FFT (Fast Fourier Transform) window position detector that identifies a start timing of the OFDM symbol included in the received modulation wave; and
an FFT unit configured to apply FFT processing to the received modulation wave on the basis of the start timing of the OFDM symbol, which is identified by the FFT window position detector, and
applies the demodulation processing to the received modulation wave that has been subjected to the FFT processing, to generate the demodulation data.

5. The receiver according to claim 1,
wherein the interference wave detector executes, as the replacement processing, processing of replacing the received signal exceeding the threshold with 0 as the predetermined value.

6. The receiver according to claim 1,
wherein the interference wave detector executes processing of replacing the received signal exceeding the threshold with the threshold as the predetermined value.

7. The receiver according to claim 1,
wherein the demodulator further includes a second interference wave power estimation unit configured to estimate interference wave power included in a first OFDM symbol included in the received modulation wave on the basis of interference wave power included in a second OFDM symbol that is different from the first OFDM symbol and magnitude of an effect on the first OFDM symbol, which is brought by the interference wave power included in the second OFDM symbol, and
the demodulated data generator applies demodulation processing including error correction taking into account the interference wave power estimated by the first interference wave power estimation unit to a first OFDM symbol group having at least one OFDM symbol included in the received modulation wave, to generate demodulation data for the received modulation wave, and applies demodulation processing including error correction taking into account the interference wave power estimated by the second interference wave power estimation unit to a second OFDM symbol group having an OFDM symbol that is the OFDM symbol included in the received modulation wave other than the OFDM symbol of the first OFDM symbol group, to generate the demodulation data for the received modulation wave.

8. The receiver according to claim 7,
wherein the receiver receives an airwave based on a Digital Video Broadcasting-Terrestrial 2 (DVB-T2) scheme as the modulation wave, and
the demodulated data generator uses an OFDM symbol group including no OFDM symbol having a CP (Continual Pilot) signal as the first OFDM symbol group, to generate the demodulation data for the received modulation wave.

9. The receiver according to claim 7,
wherein the demodulated data generator uses an OFDM symbol group including an OFDM symbol having a P2 symbol or an FC (Frame Close) symbol according to the DVB-T2 scheme as the first OFDM symbol group, to generate the demodulation data for the received modulation wave.

10. The receiver according to claim 1,
wherein the demodulated data generator further includes a channel estimation unit configured to estimate a channel characteristic of the modulation wave on the basis of the interference wave power estimated by the first interference wave power estimation unit, and
the demodulated data generator demodulates the received modulation wave by executing demodulation processing based on the channel characteristic estimated by the channel estimation unit, to generate the demodulation data.

11. The receiver according to claim 10,
wherein the channel estimation unit includes a plurality of different channel estimation interpolation units that perform mutually different methods of interpolating the channel characteristic,
the first interference wave power estimation unit is configured to estimate interference power corresponding to each of the channel estimation interpolation units, and
the channel estimation unit is configured to output one of outputs from the plurality of channel estimation interpolation units as the channel characteristic on the basis of the interference power estimated by the first interference wave power estimation unit.

12. The receiver according to claim 1,
wherein the first interference wave power estimation unit is configured to calculate interference wave power included in the OFDM symbol included in the received modulation wave, using the number of samples that have been subjected to the replacement processing in the OFDM symbol, the number of FFT samples in the OFDM symbol, and a predetermined coefficient.

13. The receiver according to claim 1,
wherein the demodulated data generator further includes
a channel estimation unit configured to estimate a channel characteristic of each carrier included in a fourth OFDM symbol disposed before or after a third OFDM symbol included in the received modulation wave by interpolation using channel characteristic calculated using a pilot signal included in the third OFDM symbol,
an equalizer configured to execute equalization processing of correcting the signal of the fourth OFDM symbol on the basis of the channel characteristic estimated by the channel estimation unit, an error correction unit configured to perform error correction for the signal corrected by the equalizer on the basis of reliability information representing reliability of the signal corrected by the equalizer, and a reliability information estimation unit configured to estimate reliability information of a signal included in the fourth OFDM symbol on the basis of interference wave power of the third OFDM symbol, which is estimated by the interference wave power estimation unit.

14. An integrated circuit comprising:

a demodulator that demodulates a modulation wave modulated according to orthogonal frequency division multiplexing (OFDM), the demodulator including:

an interference wave detector that detects that a received modulation wave that is the modulation wave received by the receiver includes interference wave when received power of each sample of the received modulation wave exceeds a threshold, and upon the detection, executes replacement processing of a replacing received signal exceeding the threshold with a predetermined value;

a first interference wave power estimation unit configured to estimate interference wave power included in an OFDM symbol included in the received modulation wave on the basis of the number of samples that have been subjected to the replacement processing; and a demodulated data generator that demodulates the received modulation wave by executing demodulation processing of demodulating the received modulation wave that has been subjected to the replacement processing by the interference wave detector on the basis of the interference wave power estimated by the first interference wave power estimation unit, to generate demodulation data.

15. A receiving method comprising demodulating a modulation wave modulated according to orthogonal frequency division multiplexing (OFDM), wherein the demodulating includes:

an interference wave detection step of detecting that received modulation wave that is the modulation wave received according to the receiving method includes interference wave when received power of each sample of the received modulation wave exceeds a threshold, and upon the detection, executing replacement processing of replacing a received signal exceeding the threshold with a predetermined value;

a first interference wave power estimation step of estimating interference wave power included in an OFDM symbol included in the received modulation wave on the basis of the number of samples that have been subjected to the replacement processing; and a demodulation data generation step of demodulating the received modulation wave by executing demodulation processing of demodulating the received modulation wave that has been subjected to the replacement processing in the detecting on the basis of the interference wave power estimated in the estimating, to generate demodulation data.

16. A non-transitory computer-readable recording medium that causes a computer to execute the receiving method according to claim 15.

* * * * *